United States Patent [19]
Bliss et al.

[11] Patent Number: 5,999,938
[45] Date of Patent: *Dec. 7, 1999

[54] SYSTEM AND METHOD FOR CREATING A NEW DATA STRUCTURE IN MEMORY POPULATED WITH DATA FROM AN EXISTING DATA STRUCTURE

[75] Inventors: William J. Bliss, Woodenville; Jerry R. Hughson, Jr., Bothell; Lois E. Bauer, Fall City; Suryanarayanan Raman, Redmond; Michael L. Roberts, Seattle; Eric Horvitz, Kirkland; Erich S. Finkelstein, Bellevue, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/791,597

[22] Filed: Jan. 31, 1997

[51] Int. Cl.⁶ .................................................... G06F 17/30
[52] U.S. Cl. ........................................... 707/102; 707/104
[58] Field of Search ..................................... 707/101, 102, 707/103, 104, 1, 2, 100, 10, 200

[56] References Cited

U.S. PATENT DOCUMENTS

| | | | |
|---|---|---|---|
| 5,119,465 | 6/1992 | Jack et al. | 395/500 |
| 5,530,865 | 6/1996 | Owens et al. | 395/680 |
| 5,625,823 | 4/1997 | Debenedictis et al. | 395/706 |
| 5,627,912 | 5/1997 | Schutzman et al. | 364/514 R |
| 5,627,972 | 5/1997 | Shear | 395/200.76 |
| 5,694,563 | 12/1997 | Belfiore et al. | 345/352 |
| 5,734,901 | 3/1998 | Sidhu et al. | 395/680 |
| 5,805,811 | 9/1998 | Pratt et al. | 395/200.36 |

OTHER PUBLICATIONS

"Intelligent Information–Sharing Systems," Malone et al., Computing Practices, vol. 30, No. 5, May 1987.

"Knowledge Based Documents Classification Supporting Integrated Document Handling," Eirund et al, ACM Conference on Office Information Systems, 1988.

(List continued on next page.)

*Primary Examiner*—Wayne Amsbury
*Assistant Examiner*—Srirama Channavajjala
*Attorney, Agent, or Firm*—Jones & Askew, LLP

[57] ABSTRACT

A system and method for creating a new destination data structure in memory populated with data from fields of an existing source data structure. A representation of the source is selected, dragged over, and dropped onto an icon representing a program module. The source and the program module are each associated with a type of data structure. If these types of data structures are different, then the destination is created in memory of the type associated with the program module. Once the destination is created, the data within the source is transformed to populate predetermined fields of the destination. One way of populating the destination is by determining which field in the destination corresponds to a given field in the source. Data from a given field of the source is loaded into the corresponding field of the destination. This is performed for each of the fields in the source, thus transferring the data into the destination from the source without having to manually re-enter or perform successive copy and paste operations on the data in the fields of the destination. Another way of populating the destination is by formatting data from each of the printable fields of the source into a predetermined rich text format to yield a formatted version of the source as if the source were being printed in one of the fields of the destination. The formatted data is then loaded into the field of the destination.

4 Claims, 17 Drawing Sheets

OTHER PUBLICATIONS

"A Rule–Based Message Filtering System," Pollock, ACM Transactions on Office Information Systems, vol. 6, No. 3, Jul. 1988.

"Cooperative Work in the Andrew Message System," Borenstein et al., ACM Proc. Conference on Computer Supported Cooperative Work, 1988.

"Semi–Structured Messages are Surprisingly Useful for Computer–Supported Coordination," Malone et al., ACM Proc. Conference on Computer Supported Cooperative Work, 1988.

"Office–by–Example: An Integrated Office System and Database Manager," Whang et al., IBM Thomas J. Watson Research Center, ACM Transactions on Office Information Systems vol. 5, No. 4, pp. 393–427, Oct. 1987.

SYSTEM AND METHOD FOR CREATING A NEW DATA STRUCTURE IN MEMORY POPULATED WITH DATA FROM AN EXISTING DATA STRUCTURE

CROSS-REFERENCE TO OTHER PENDING APPLICATIONS

Reference is made to U.S. patent application Ser. No. 08/792,002 entitled "Goal-Driven Information Interpetation and Extraction System" now U.S. Pat. No. 5,864,848.

TECHNICAL FIELD

This invention generally relates to creating a new data structure in memory using existing data and, more particularly described, relates to creating a destination data structure in memory populated with data from specific fields of a source data structure.

BACKGROUND OF THE INVENTION

Many people today are pressured to maintain an increasingly dynamic lifestyle. It is easy to imagine hearing complaints from such people, such as "Who do I meet with this morning?", "Where is an open spot on my ever-changing calendar for another meeting?", or "I don't have time to keep track of all the things I have to do?"

We can attempt to solve these kinds of nagging and often stressful dilemmas by conducting business and our personal lives with the assistance of a computer. The computer can help by maintaining a schedule of appointments, managing a list of tasks, keeping track of a list of contacts important to the computer user, and managing the computer user's electronic mail. Desktop information management programs or personal information management programs have been used as a tool to implement this kind of assistance within the computer.

As mentioned above, desktop information management programs traditionally encompass this variety of distinct functions, such as maintaining schedule appointments, mail messages, contacts, etc., in a single program module. Some desktop information management programs encompass the distinct functions in different program modules internal to the desktop information management program. Each of the internal program modules maintain information, such as electronic mail messages or appointments, as "items" that are maintained in data structures. However, each of the internal program modules need to "interact" with the other internal program modules to coordinate efficient use of the maintained information. For example, Jenny Blake receives an electronic mail message from Bob Johnston, who has suggested that they go to a movie next Friday evening. Jenny wants to make an appointment within her desktop information management program to reserve time for the movie in her schedule. In the past, Jenny would have to manually copy or re-enter the information contained in each field of the electronic mail message into fields of a new appointment item within the desktop information management program. This can be a cumbersome and time-consuming task. Jenny would rather be able to use the information already in the electronic mail message and somehow automatically transform it into the proper fields of the new appointment item.

A problem arises because the mail message may have different fields when compared to the appointment item. There may not be a simple direct conversion between identical fields. More particularly, the mail message may have a subject field and a message follow-up time field. However, the appointment may have a subject field but may not have a message follow-up field. What should be done with the information in a field that does not have a matching field in the new item? Should that information be left out of the new item? Can that information still be used in the new item? Therefore, there exists a need for using as much information contained in an existing item as possible when creating a new item without forcing the computer user to manually copy or re-enter each piece of existing information in the right place or field in the new item.

In the past, computer users have had to work around this problem by manually creating a new item and then performing a conventional cut and paste operation to transfer each piece of the existing information to the proper field in the new item. However, this still forces the computer user to manually transform the information between the existing item and the new item.

The inventors of the present application are aware of a software application called Arabesque ECCO that has a simplification process for cutting and pasting information from other external application programs into the ECCO application program. The inventors of the present invention understand that the simplification process, also known as the Shooter feature, enables users to select an item of text created by other application programs and to invoke a menu within the ECCO application program. The user chooses the type of item within the ECCO application program to create using the selected item. However, the ECCO application program apparently cannot create a new item by selecting an existing item created by the ECCO application program itself. Furthermore, the ECCO application program seems to have problems mapping information from distinct fields of the selected item into specific fields of the new item to fully utilize the existing information in the selected item.

Therefore, there is a need for a system for creating a destination data structure, which physically represents a new item, populated with existing information from specific fields of a source data structure, which physically represents an existing item, without having to manually transfer the existing information into the destination data structure. There is also a need to create the destination data structure (new item) in response to a simple drag and drop operation on a representation of the source data structure (existing item). There is also a need to create the destination data structure (new item) from the existing information in more than one source data structure (existing item). Furthermore, there is a need for transforming existing information within the source data structure (existing item) into a rich text format and inserting this formatted information into the new item or data structure in order to preserve a robust, "what-you-see-is-what-you-get" (WYSIWYG) version of the existing information.

SUMMARY OF THE PRESENT INVENTION

The present invention satisfies the above-described needs by providing a system for creating a destination data structure in memory populated with data from a source data structure. The source data structure is preferably created by a first program. Alternatively, the source data structure can be created by a second program not associated with the first program. The source data structure maintains the data within one or more fields and is associated with a source type of data structure.

In general, the system receives a signal that indicates an operation between the source data structure and a destination program module associated with the first application program. The destination program module and the destination data structure are associated with a destination type of data structure. In response to receiving the signal, the system compares the source type of data structure to the destination type of data structure. If the source type of data structure is different than the destination type of data structure, the system creates the destination data structure in memory and populates the fields of the destination data structure with the data maintained in the fields of the source data structure. The system populates the fields of the destination data structure based upon the source type of data structure and the destination type of data structure.

For one aspect of the present invention, the system populates the fields of the destination data structure by determining which of the fields in the destination data structure corresponds to a field of the source data structure, preferably the first field in a predetermined order. The system loads the data from the field of the source data structure into the corresponding field of the destination data structure and repeats the determining and loading steps for each of the other fields of the source data structure, typically by the predetermined order of fields in the source data structure.

In another aspect of the present invention, the system populates the fields of the destination data structure by formatting the data maintained in fields of the source data structure into a predetermnined rich text format (RTF) as if the data were to be printed. The system then loads the formatted data into one of the fields of the destination data structure in order to populate the destination data structure. The formatted data essentially is duplicated data from the source data structure.

Thus, the system advantageously creates a new data structure (called the destination data structure) populated with existing data from specific fields of an existing data structure (called the source data structure) without having to manually transfer the existing data into the destination data structure.

More particularly described, the system receives a first signal that indicates an operation between the source data structure and the destination program module. Typically, the system receives a second signal, prior to receiving the first signal. A review of the second signal indicates a selection of the representation of the source data structure. The operation is typically a drop operation involving a representation of the source data structure onto a representation of the destination program module. The system compares the source type of data structure associated with the source data structure to the destination type of data structure associated with the destination program module and the destination data structure. If the source type of data structure is different than the destination type of data structure, then the system identifies one or more transform functions based upon the source type of data structure and the destination type of data structure. In one implementation, the system identifies the transform functions by displaying a menu of one or more commands and receiving a command signal that indicates which of the commands are desired. The desired command is associated with the identified transform functions.

In response to identifying the transform functions, the system creates in memory the destination data structure having one or more fields and executes each of the identified transform functions. Upon execution of the transform functions, the system transforms the data into one or more predetermined fields of the destination data structure in order to populate the destination data structure with the data. This has the advantage of efficiently creating the destination data structure populated with existing data in response to a drag and drop operation.

In another aspect of the present invention, the system identifies a source field, typically a first source field in a predetermined order, from the fields in the source data structure and determines a destination field in the destination data structure that corresponds to the identified source field. The system loads the data from the identified source field into the corresponding destination field and repeats for each of the other fields in the source data structure, typically according to the predetermined order, in order to populate the destination data structure.

In another aspect of the present invention, the system formats the data from each of the fields in the source data structure into a predetermined Rich Text Format (RTF) as if the data were to be printed. Then the system loads the formatted data into one of the fields in the destination data structure in order to populate the destination data structure. This advantageously transforms the existing data into a "what-you-see-is-what-you-get" (WYSIWYG) version of the existing data (also called the formatted data) and preserves it within the destination data structure. Additionally, this aspect of the present invention may advantageously duplicate other fields which have already been transferred from the source data structure thus providing the information in more than one format in the destination data structure.

In another aspect of the present invention, a computer-readable medium is described on which is stored a computer program for creating a destination data structure in memory populated with data from more than one source data structure. Each of the source data structures is created by the computer program and has one or more fields where the data is maintained. The computer program instructions, which when executed, receive a signal that indicates an operation between the source data structures and the destination program module. The executed computer program instructions determine a type of data structure associated with each of the source data structures and compare the type of data structure associated with each of the source data structures. If any of the source data structures are of different types, the executed computer program instructions assign the type of data structure associated with each of the source data structures to be a general format. The executed computer program instructions compare the destination type of data structure to the type of each of the source data structures. If the destination type of data structure is different than the type of any of the source data structures, the executed computer program instructions create the destination data structure in memory. The destination data structure is created having fields and being of the destination type of data structure. Finally, the executed computer program instructions attach a copy of each of the source data structures to the destination data structure in order to populate the destination data structure.

Additionally, the executed computer program instructions insert a pointer in one of the fields of the destination data structure. The pointer points to each copy of the source data structures. Thus, data from more than one source data structure can be used to create and populate the destination data structure without having to manually re-enter the data from each of the source data structures into the destination data structure.

In another aspect of the present invention, a computer-readable medium is described on which is stored a computer program for transforming data from a plurality of fields in a source data structure into formatted data within a field in a destination data structure. The computer program instructions, when executed, receive a signal that is indicative of an operation on the source data structure. The executed computer program instructions identify a field in the source data structure, preferably a first field according to a predetermined order, and determine if the data within the identified field can be printed. If so, then the executed computer program instructions format the data within the identified field into a predetermined rich text format as if the data within the identified field were to be printed. The executed computer program instructions load the formatted data into the field in the destination data structure and repeats from the identifying step for each of the other fields in the source data structure, preferably according to the predetermined order. In this manner, the data within the source data structure is efficiently transformed into formatted data within the field of the destination data structure thereby advantageously preserving the data within the destination data structure.

The present invention and its advantages, those described above and otherwise, will be appreciated from studying the following detailed description and drawings, and the appended claims.

DETAILED DESCRIPTION OF THE PREFERRED EMBODIMENT

Figure 1:
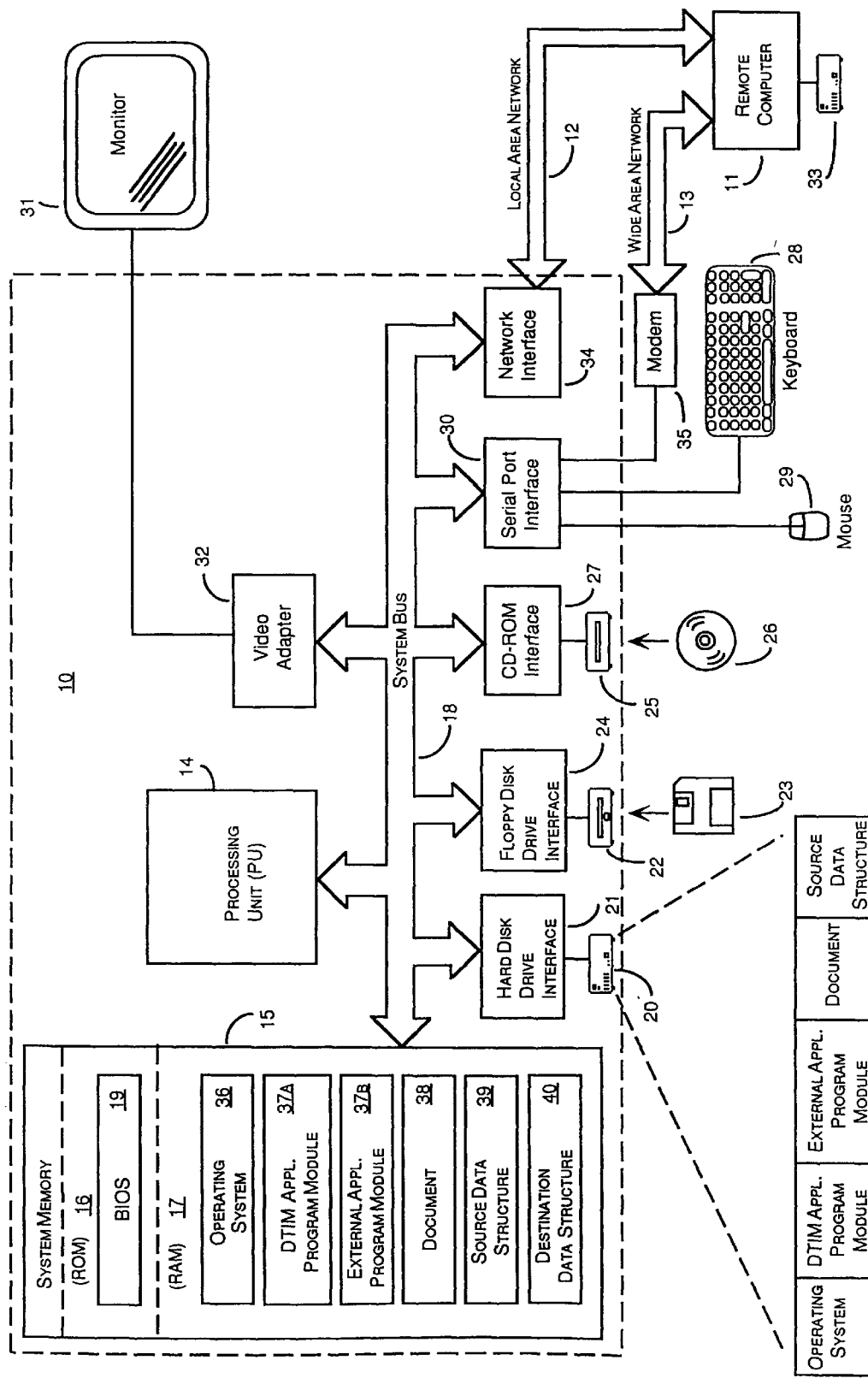
FIG. 1 is a block diagram of a personal computer that provides the operating environment for the preferred embodiment of the present invention.

The present invention is directed to a system for creating a new data structure, referred to as a destination data structure, in memory populated with data from an existing data structure, referred to as a source data structure. The preferred embodiment of the present invention is represented by a program module called "OUTLOOK", which is a desktop information management program developed by Microsoft Corporation of Redmond, Wash.

Briefly described, the desktop information manager (DTIM) program module allows users to manage their own calendar, tasks or "to-do"list, notes, contacts, and electronic mail messages via different program modules internal to the DTIM program module. Each program module maintains information about things such as appointments, task lists, mail messages, etc., using a distinct type of data structure in memory. For example, a data structure that maintains a mail message (having fields such as To, From, Date, Subject, etc.) is different or is of a different type when compared to a data structure that maintains an appointment (having fields such as Time, Date, Subject, Recurrence, etc.). The term "item" is essentially a conceptual way of referring to the collective information stored in the fields of the data structure. Those skilled in the art will recognize that the data structure is the physical mechanism representing a given item, such as an appointment or a mail message.

The DTIM program module allows a user to easily create a new item (such as a new appointment or a new task) maintained in a destination data structure from an existing item (such as a mail message) maintained in a source data structure using a drag and drop operation on representations of the items or data structures. This process is called "coercion" and is the focus of the present application.

When "coercing" using drag and drop techniques, a representation of the source data structure is selected with a button on the mouse and dragged onto an icon representing a different type of data structure. When the mouse button is released, the representation of the source data structure is dropped onto the icon and the information from specific fields of the source data structure is automatically transformed into specific fields of the destination data structure. The data can be transformed by transferring data from each field in the source to a specific field in the destination depending on the types of the source data structure and destination data structure. Additionally, the data from each field in the source can be transformed by formatting all printable information maintained in each field of the source into a rich text format and inserting the formatted data into a body field of the destination data structure. In this manner, a user is able to advantageously glean as much information from an existing item (source data structure) when creating a new item (destination data structure). The new item, physically maintained in the destination data structure, is already populated with the existing information without having to manually re-enter the data into each field of the new item. In this manner, the new item (destination data structure) is "coerced" from the existing information in the source item (source data structure).

Those skilled in the art will realize that the coercion process is not limited to drag and drop techniques. It is important to realize that the new item can be coerced from the existing information in the source item in response to conventional copy/paste operations as well as direct menu commands that initiate a coercion operation between the new item and the source item.

Although the preferred embodiment will be generally described in the context of a DTIM program module and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet.

The detailed description which follows is represented largely in terms of processes and symbolic representations of operations by conventional computer components, including a processing unit (processor), memory storage devices, connected display devices, and input devices. Furthermore, these processes and operations may utilize conventional computer components in a heterogeneous distributed computing environment, including remote file servers, compute servers, and memory storage devices. Each of these conventional distributed computing components is accessible by the processor via a communication network.

The processes and operations performed by the computer include the manipulation of signals by a processor and the maintenance of these signals within data structures resident in one or more memory storage devices. In the context of the present invention, a "data structure" is a structured organizational scheme, such as a record or a list in a file or data object, that encapsulates data in fields or encapsulates other data structures to support data interpretation and data operations. A representation of such a data structure can be a graphical image (such as an icon), a data field containing the encapsulated data, or both an image and a data field. The data structure imposes a physical organization upon the collection of data stored within a memory storage device and represents specific electrical or magnetic elements. These representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, elements, symbols, characters, numbers, points, data, entries, objects, images, files or the like. It should be kept in mind, however, that these and similar terms are associated with appropriate physical quantities for computer operations, and that these terms are merely conventional labels applied to physical quantities that exist within and during operation of the computer.

In general, a program module may use an interprocess communication to communicate with another program module. An interprocess communication is the ability of a task or process to exchange data with another task or process. Examples of such interprocess communications readily recognized by those skilled in the art include the use of pipes, semaphores, shared memory, application programming interfaces (API), and remote procedure calls (RPCs).

It should also be understood that manipulations within the computer are often referred to in terms such as creating, adding, comparing, moving, receiving, determining, identifying, populating, loading, executing, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

Figure 2:
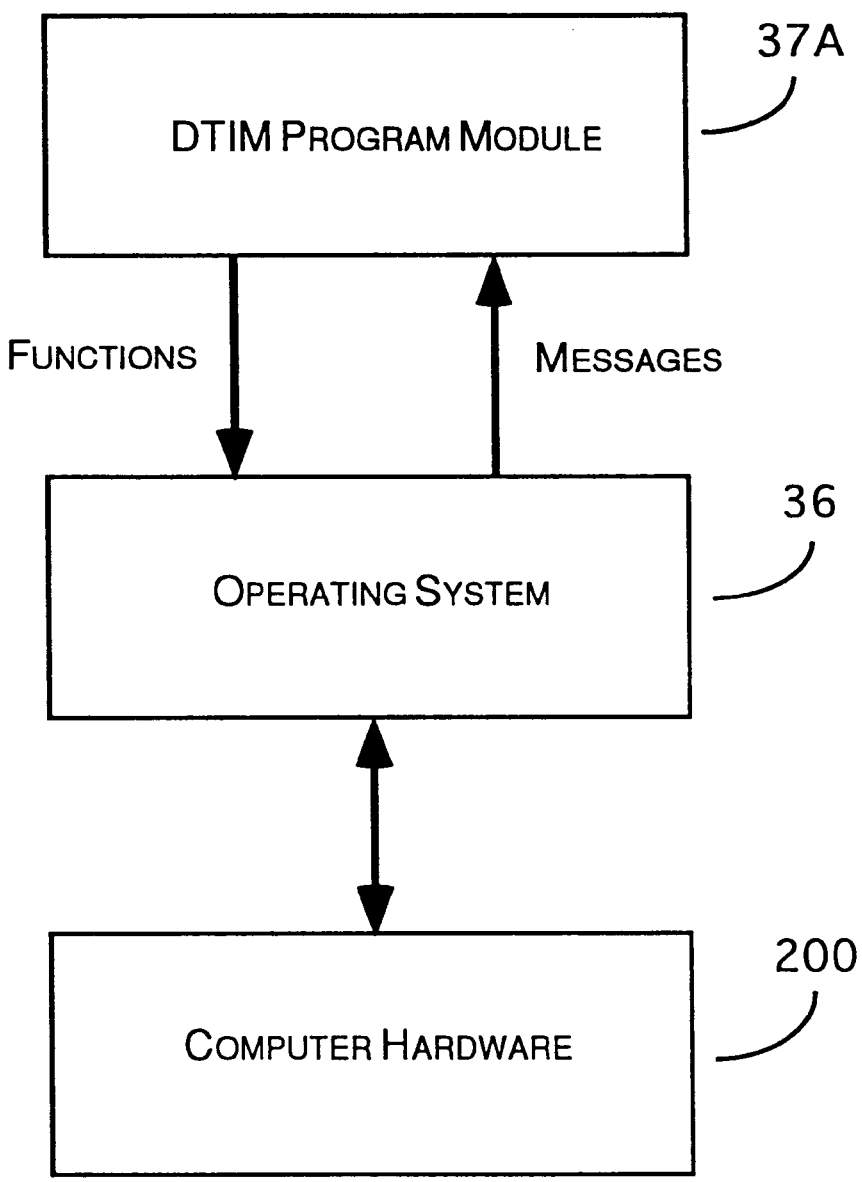
FIG. 2 is a block diagram illustrating an interface between a computer's input/output devices, an operating system, and a program module.

FIGS. 1 and 2 illustrate various aspects of the preferred computing environment in which the present invention is designed to operate. Those skilled in the art will immediately appreciate that FIGS. 1 and 2 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a processing unit (processor) 14, preferably the "PENTIUM" family of microprocessors manufactured by Intel Corporation of Santa Clara, Calif. However, it should be understood that the invention can be implemented on computers based upon other microprocessors, such as the "MIPS" family of microprocessors from the Silicon Graphics Corporation, the "POWERPC" family of microprocessors from both the Motorola Corporation and the IBM Corporation, the "PRECISION ARCHITECTURE" family of microprocessors from the Hewlett-Packard Company, the "SPARC" family of microprocessors from the Sun Microsystems Corporation, or the "ALPHA" family of microprocessors from the Digital Equipment Corporation.

The personal computer 10 also includes system memory 15 (including read only memory (ROM) 16 and random access memory (RAM) 17), which is connected to the processor 14 by a system bus 18. The BIOS 19 for the personal computer 10 is stored in ROM 16. Those skilled in the art will recognize that the BIOS 19 is a set of basic routines that helps to transfer information between components within the personal computer 10. However, it should be appreciated that other types of computers may transfer information between elements within the computer without the use of a BIOS 19 and that the invention can readily be implemented in such computers without a BIOS 19.

Within the personal computer 10, a hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27.

A user enters commands and information into the personal computer 10 by using a keyboard 28 and/or pointing device, such as a mouse 29, which are connected to the system bus 18 via a serial port interface 30. Typically, the mouse 29 is used to position a cursor on a computer monitor 31 and has a left button and a right button that are each used to select information displayed on the computer monitor 31. Other types of pointing devices (not shown in FIG. 1) include track pads, track balls, joy sticks, data gloves, head trackers, and other devices suitable for positioning the cursor on the computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules and data are provided to the personal computer 10 via one of the local or remote memory storage devices or computer-readable media, which may include the hard disk drive 20, floppy disk 23, CD-ROM 26, RAM 17, ROM 16, and the remote memory storage device 33. The present invention is not limited to these specific memory storage devices as one skilled in the art can contemplate other computer-readable medium or memory storage devices, such as magneto-optical disks (not shown), optical memory devices (not shown), and digital tapes (not shown). In the preferred embodiment, these program modules provided to the computer 10 include an operating system 36, the DTIM program module 37a, and an external application program module 37b (a program not associated with the DTIM program module 37a). In the preferred personal computer 10, the hard disk drive 20 is used to store these program modules once they are installed from a CD-ROM 26.

As previously mentioned, data is stored on one of the memory storage devices, such as RAM 17, the hard disk drive 20, or the floppy disk 23. In the preferred embodiment, data is stored in a variety of components, such as a document 38, a source data structure 39, or a destination data structure 40, in RAM 17 and on the hard disk drive 20. The document 39 is created by the external application program module 37b and essentially is a data structure with one or more fields containing data. The source data structure 39 is a data structure maintaining data within its fields and is created by the DTIM program module 37a. The source data structure is preferably maintained on the hard disk drive 20. The destination data structure 40 is a data structure created by the DTIM program module 37a according to the preferred embodiment of the present invention. The destination data structure 40 is a data structure of a different type than the source data structure 39 but has fields populated with data from specific fields of the source data structure 38. The destination data structure 40 is preferably maintained in RAM 17, but may be stored and maintained on the hard disk drive 20 as well.

FIG. 2 is a simplified block diagram illustrating the interaction between the computer hardware 200, the operating system 36, and a program module, such as the DTIM program module 37a. Referring now to both FIGS. 1 and 2, when the personal computer 10 is turned on or reset, the Basic Input/Output System (BIOS) 19, which is stored in the ROM 16, instructs the processor 14 to load the operating system 36 from the hard disk drive 20 into the RAM 17. Once the operating system 36 is loaded into RAM 17, the processor 14 executes the operating system 36 and causes the visual elements associated with the user-interface of the operating system 36 to be displayed on the monitor 31.

The operating system 36, in conjunction with the BIOS 19 (FIG. 1) and associated device drivers, provides the basic interface between the computer's hardware and software resources, the user, and the DTIM program module 37a. The operating system 36 interprets and carries out instructions issued by the user. For example, when the user wants to load a program module, such as the DTIM program module 37a, the operating system 36 interprets the instruction (e.g., double clicking on the program module's icon) and causes the processor 14 to load code associated with the program module into RAM 17 from either the hard disk drive 20, floppy disk 23, CD-ROM 26, or the remote memory storage device 33. Once the program module is loaded into the RAM 17, it is executed by the processor 14. In case of large programs, the processor 14 loads various portions of program modules into RAM 17 as needed.

As discussed earlier, the preferred embodiment of the present invention is embodied in the preferred DTIM program module 37a, which is designed to operate in conjunction with Microsoft Corporation's "WINDOWS 95" or "WINDOWS NT" operating systems. However, it should be understood that the invention can be implemented for use with other operating systems, such as Microsoft Corporation's "WINDOWS 3.1" operating system, IBM Corporation's "OS/2" operating system, and the operating system used in "MACINTOSH" computers manufactured by Apple Computer, Inc.

The operating system 36 provides a variety of functions or services that allow a program module, such as the DTIM program module 37a, to easily deal with various types of input/output (I/O). This allows program modules to issue relatively simple function calls that cause the operating system 36 to perform the steps required to accomplish various tasks, such as displaying text on the monitor 31 (FIG. 1) or indicating the position of the mouse 29 on the user-interface presented on the monitor 31.

Generally described (with reference to FIG. 2), the DTIM program module 37a communicates with the operating system 36 by calling predefined functions provided by the operating system 36. The operating system 36 responds by providing the requested information in a message or by executing the requested task. Furthermore, it should be understood that the above-described interaction can also occur between the operating system 36 and other program modules as well, such as the external application program module 37b.

From this brief description, it should be appreciated that operating systems, such as the "WINDOWS 95" and "WINDOWS NT" operating system, are quite complex and provide a wide variety of services that allow users and programs to utilize the resources available in the personal computer. Those skilled in the art will be familiar with operating systems and their various features, which include, but are in no means limited to, the specific messages and functions described above. For more comprehensive information regarding the "WINDOWS 95" and "WINDOWS NT" operating system and its interaction with programs, the reader may refer to any of a variety of publications, including the "Win32 Programmer's Reference" and "Advanced Windows", both published by Microsoft Press.

Likewise, those skilled in the art will appreciate that the preferred DTIM program module 37a provides a wide variety of features and functions in addition to those included in the brief description presented above.

The Preferred DTIM Program Module

Figure 4A:
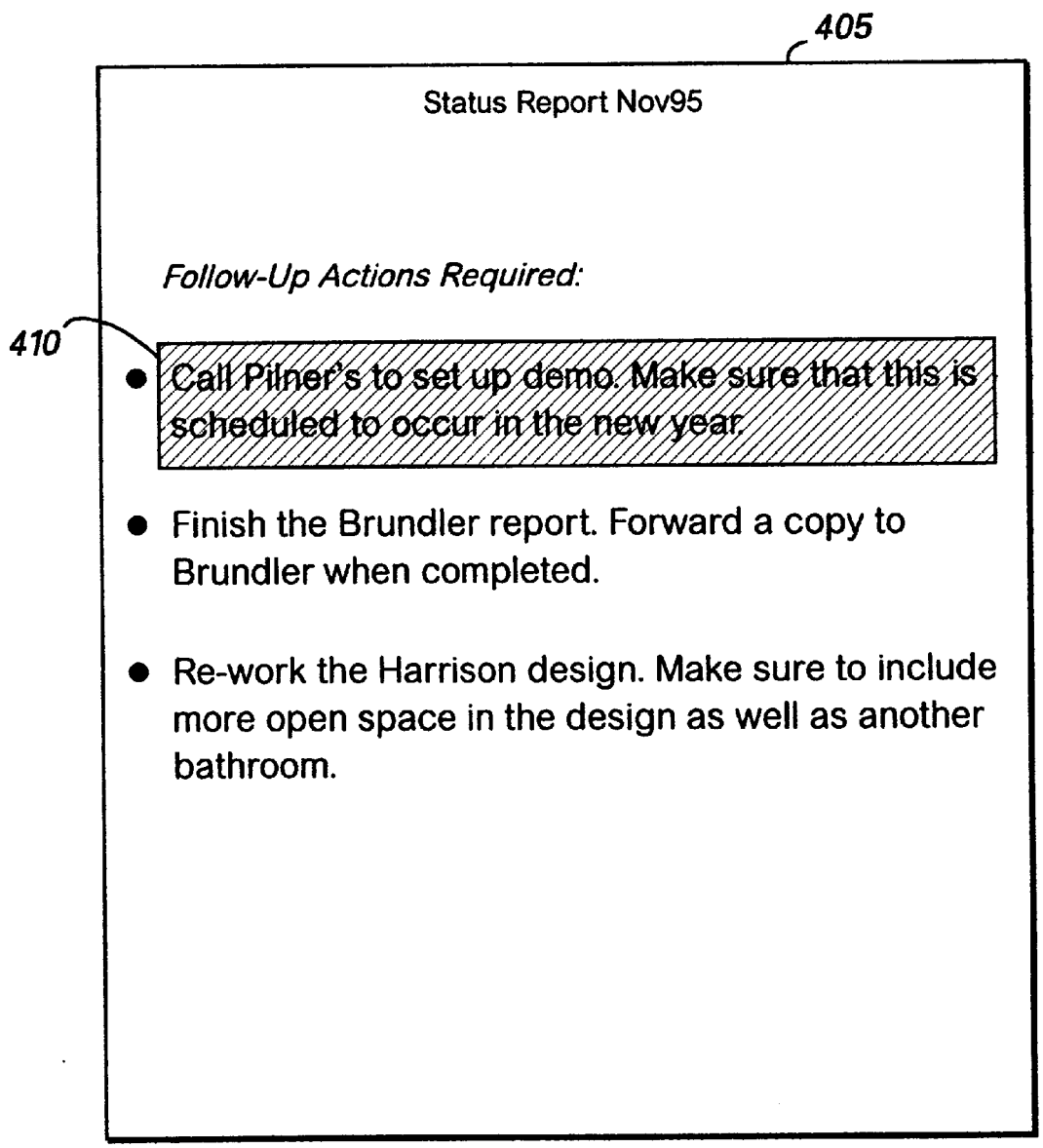
FIG. 4, consisting of FIGS. 4A and 4B, are screen displays for supporting drag and drop coercion from outside the preferred program in accordance with the preferred embodiment of the present invention.
Figure 4B:
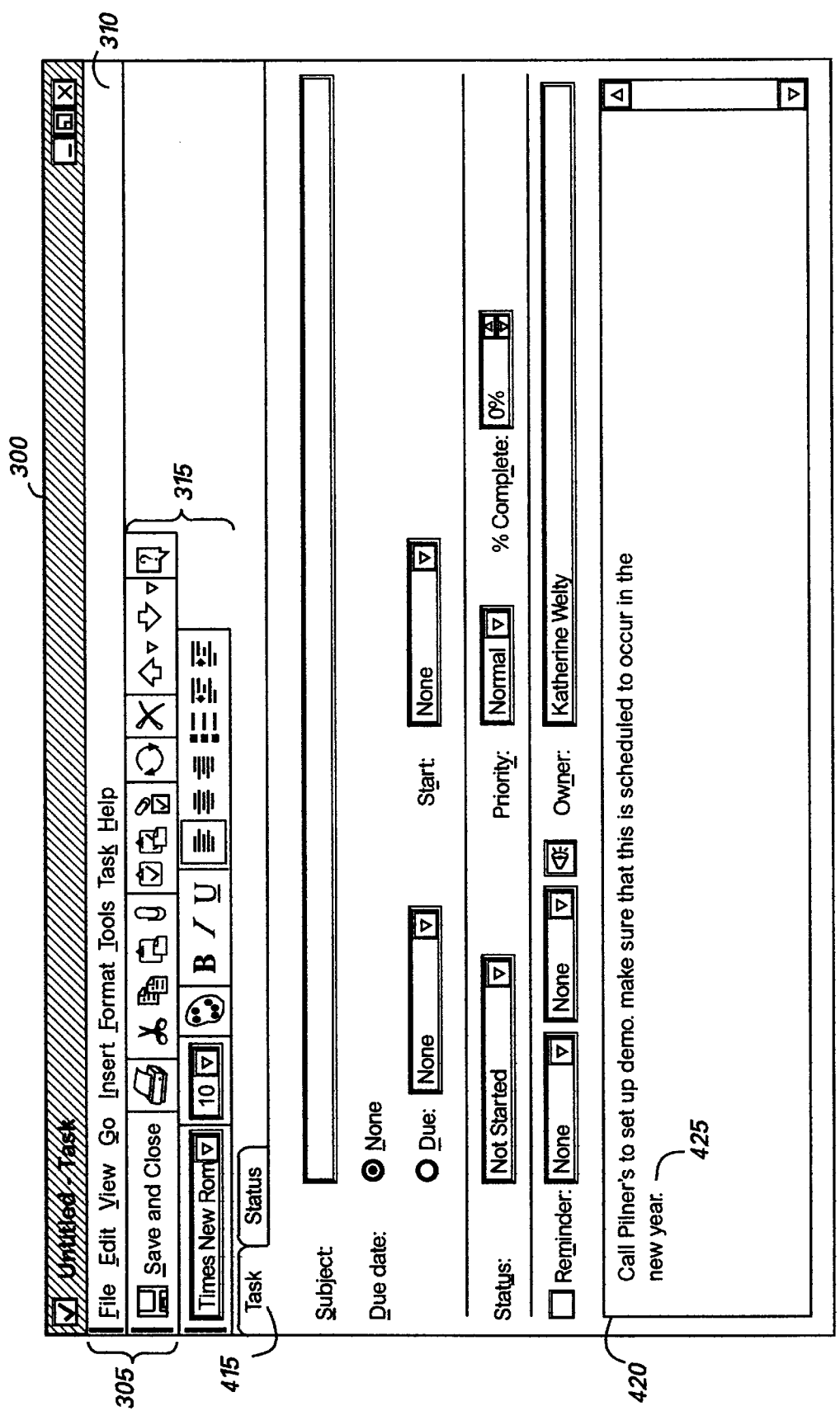
Figure 5:
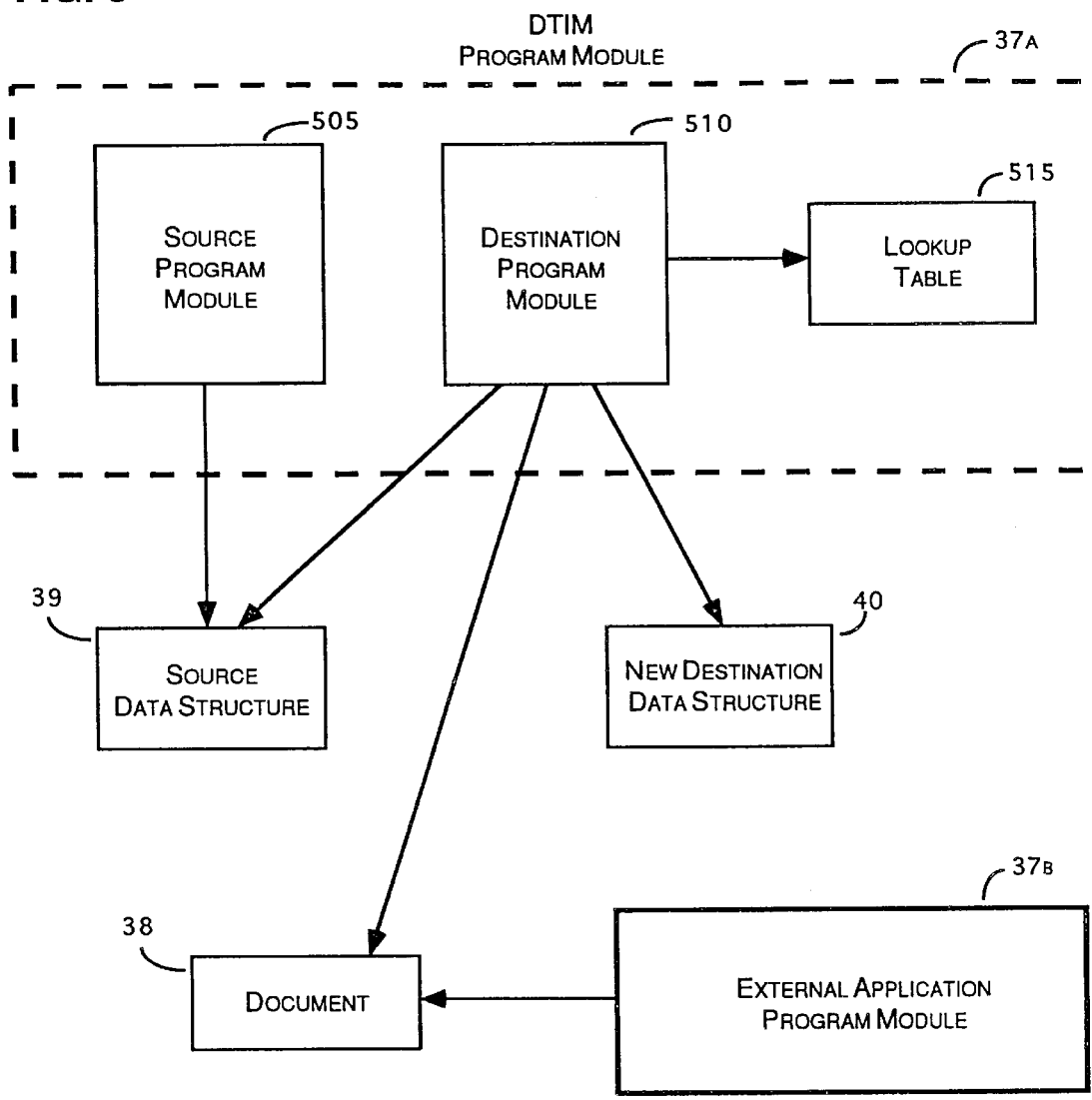
FIG. 5 is a block diagram illustrating the preferred components for creating a destination data structure in memory populated with data from a source data structure or from a document.
Figure 6:
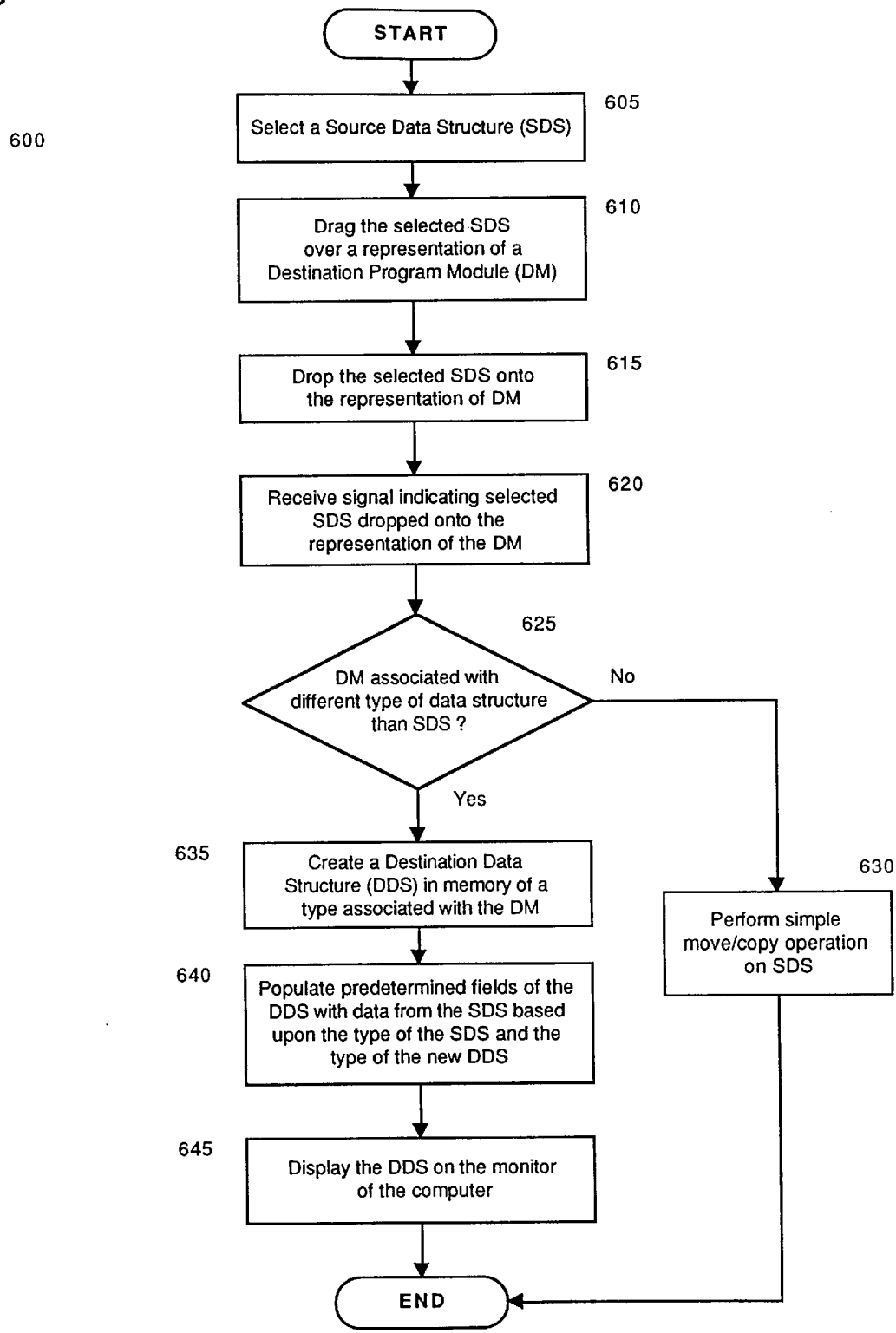
FIG. 6 is a flow diagram illustrating steps of the preferred method for creating a destination data structure in memory populated with data from a source data structure.
Figure 7A:
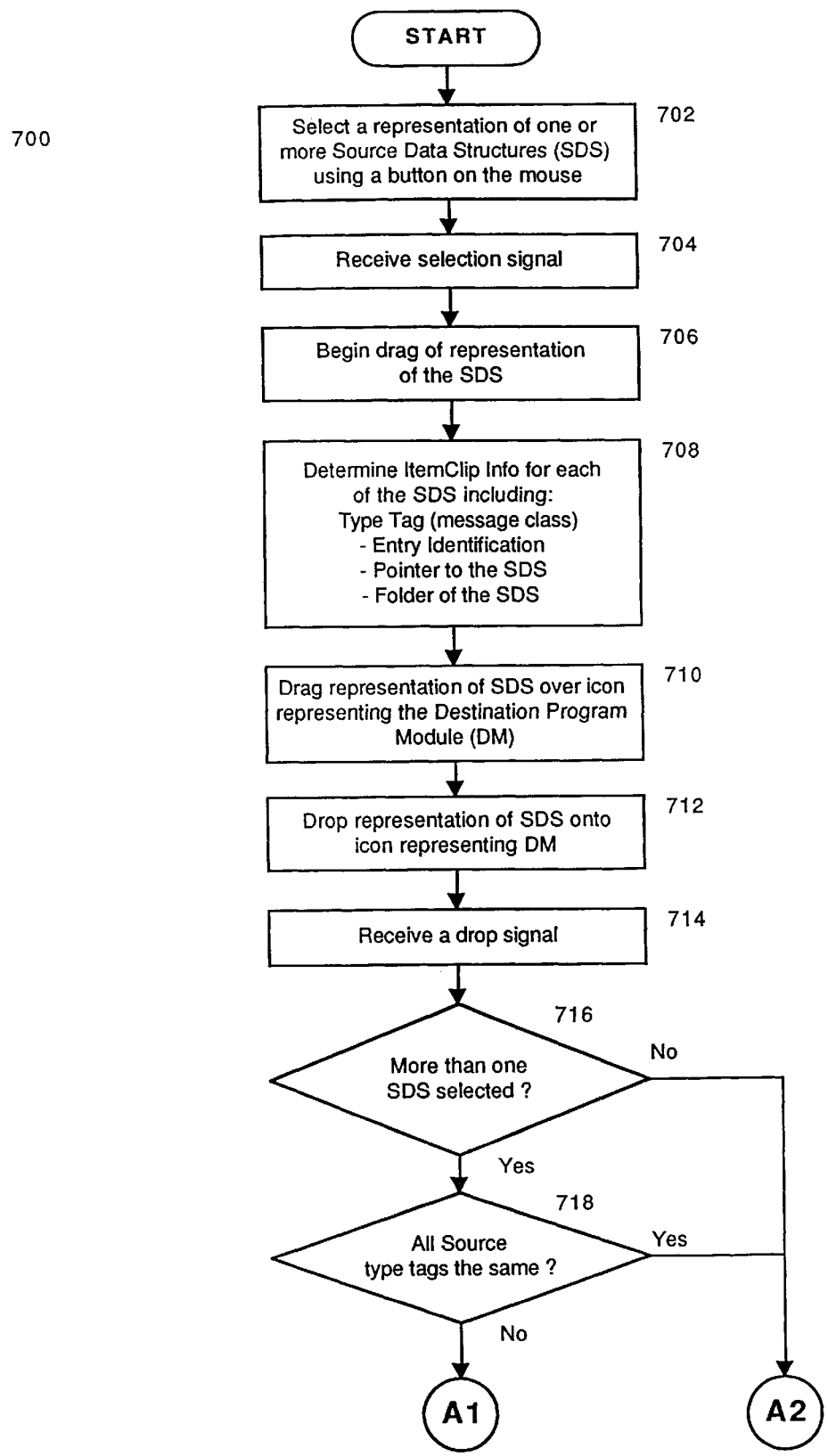
FIG. 7, consisting of FIGS. 7A–7C, is a detailed flow diagram illustrating steps of the preferred method for creating a destination data structure in memory populated with data from a source data structure using drag and drop techniques.
Figure 7B:
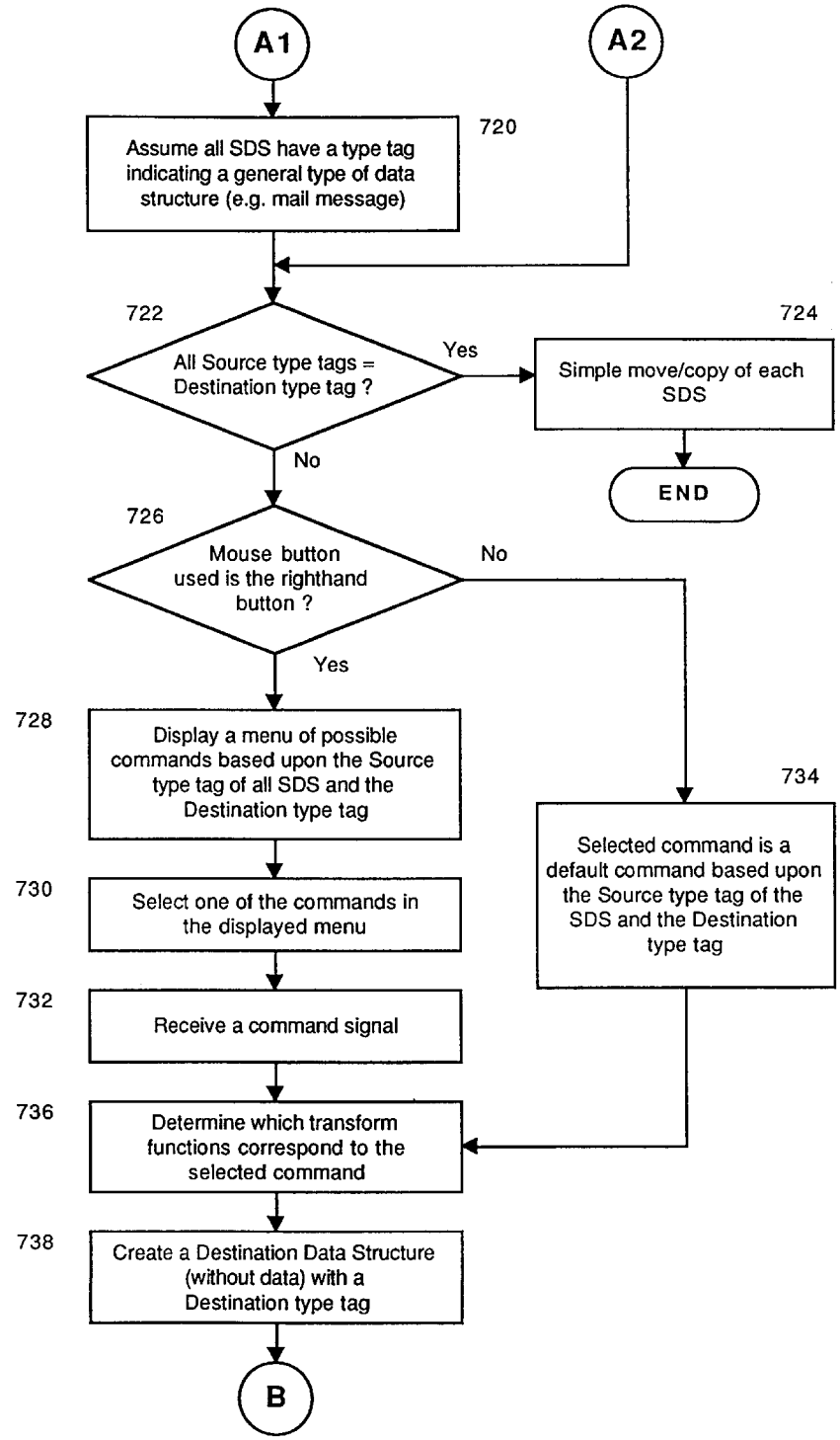
Figure 7C:
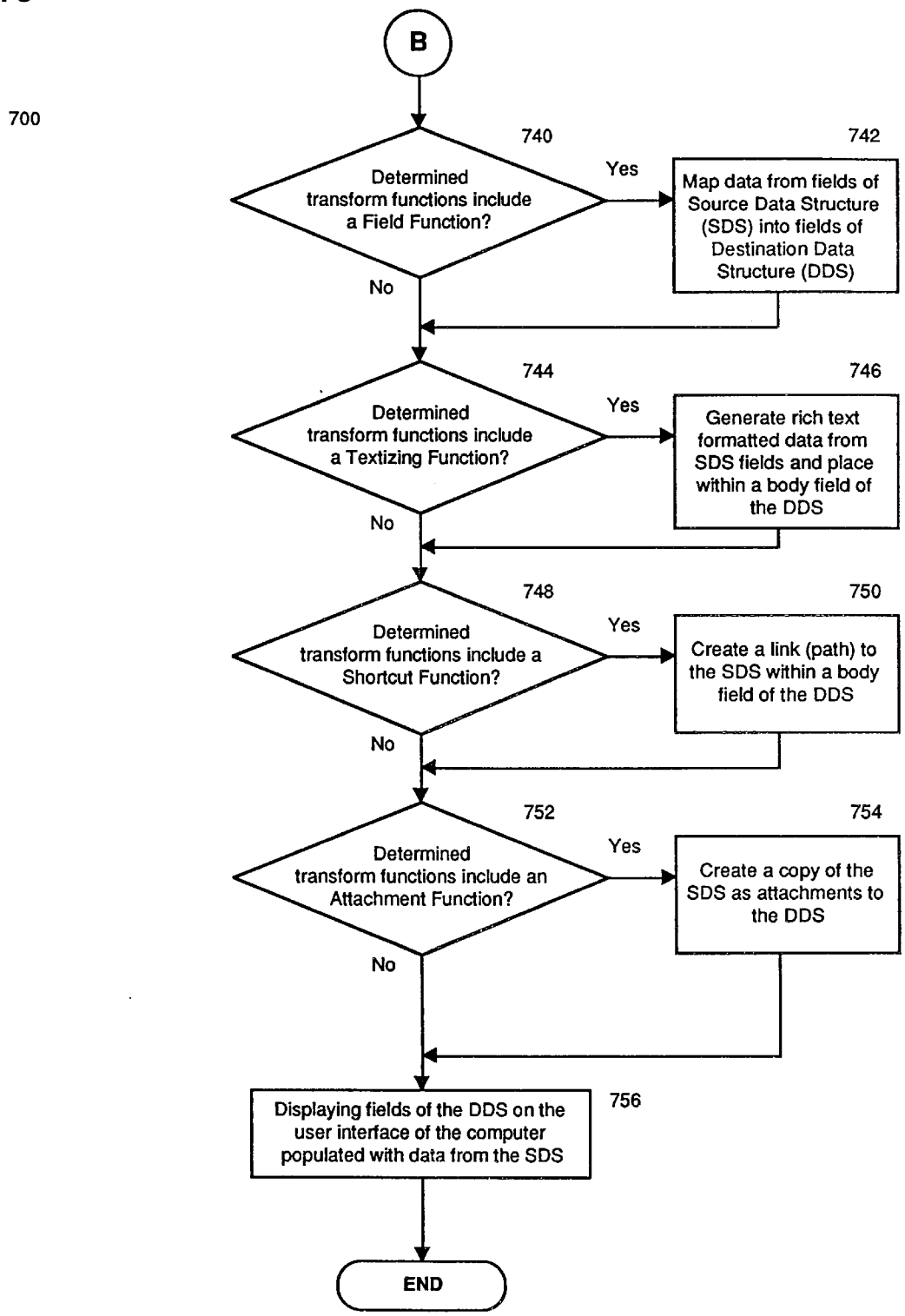
Figure 8:
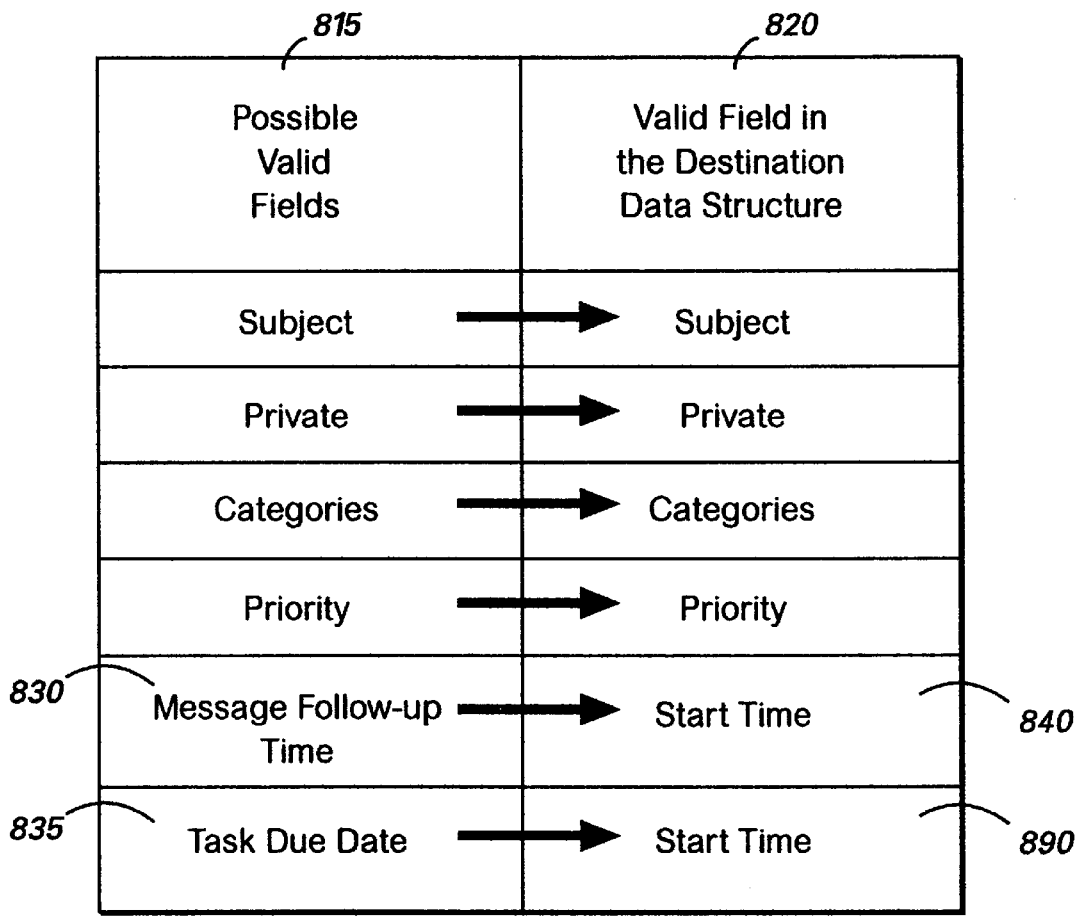
FIG. 8 is a table illustrating the contents of an exemplary lookup table maintaining information used when executing a field transform function that maps fields from a source data structure to corresponding fields in a destination data structure.
Figure 9:
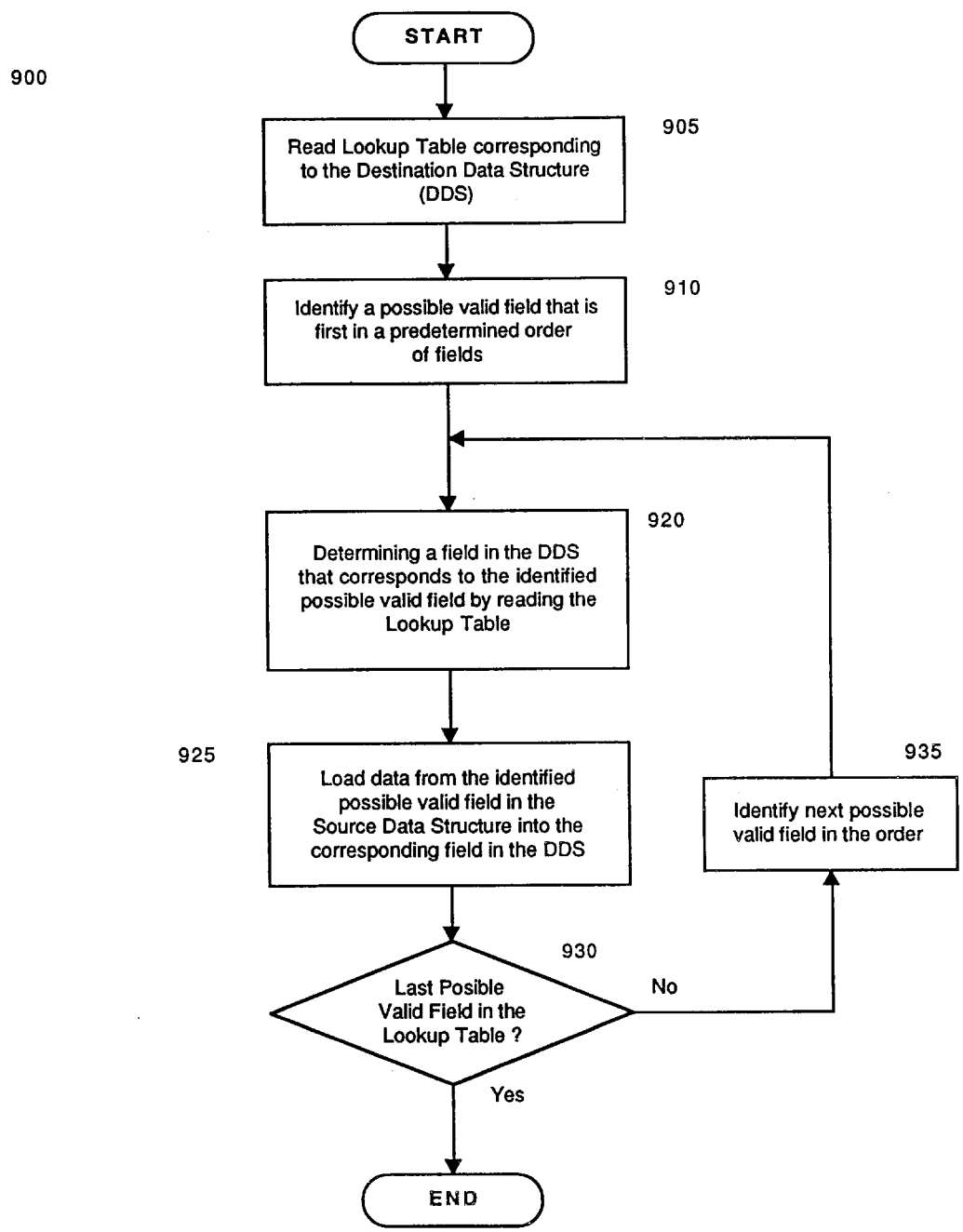
FIG. 9 is a flow diagram illustrating the steps of a field transform function that maps fields from a source data structure to corresponding fields in a destination data structure.
Figure 10:
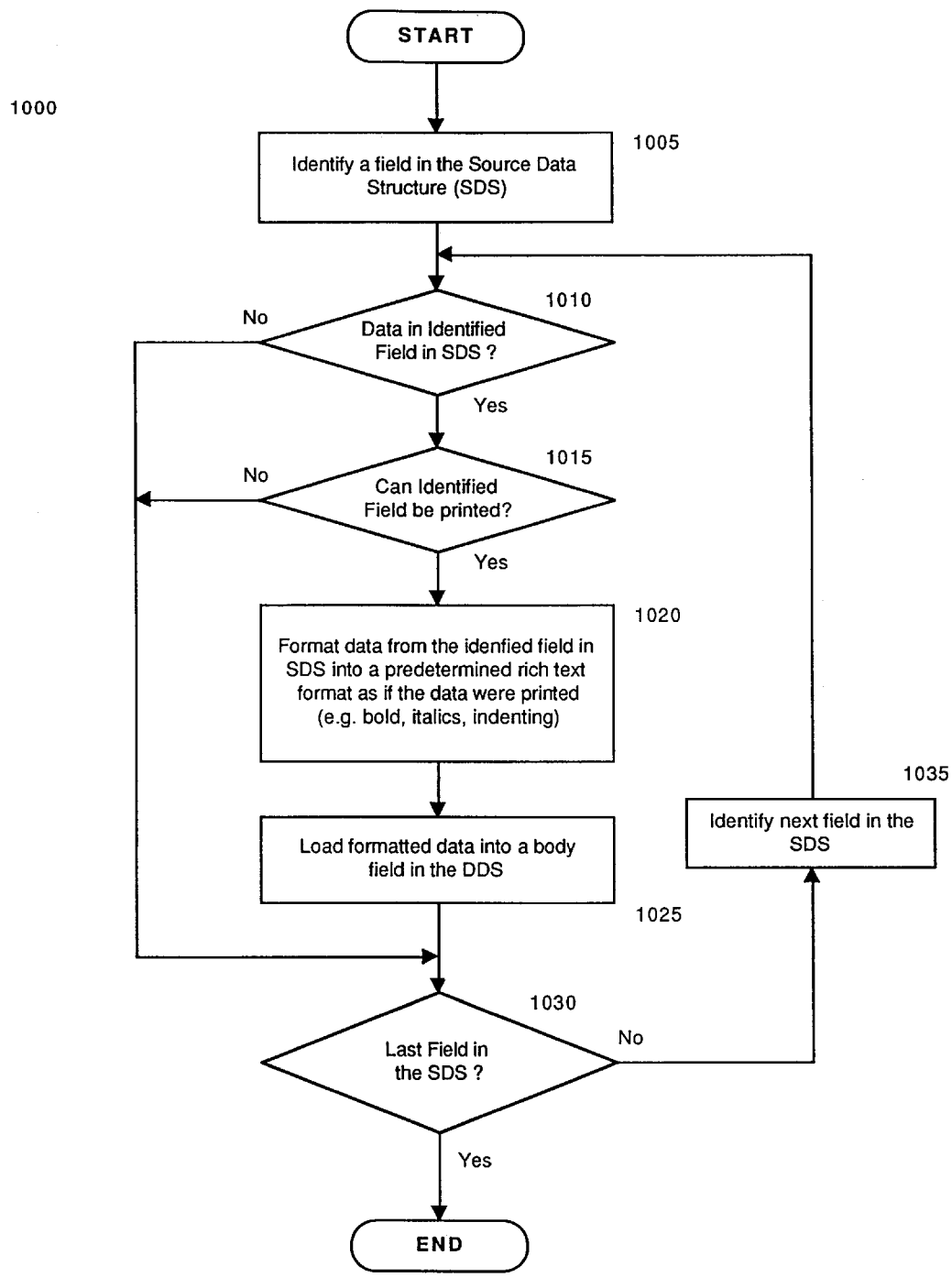
FIG. 10 is a flow diagram illustrating the steps of a text transform function that transforms data maintained in fields of a source data structure into richly formatted data as if the data were to be printed.

Turning now to FIGS. 3–10, the preferred embodiment of the present invention is described. FIGS. 3–4 are screen displays illustrating the user interface supporting the preferred embodiment of the present invention. FIG. 5 is a block diagram generally illustrating the different program modules and data structures within the preferred embodiment. FIGS. 6 and 7 are flow diagrams illustrating the preferred method for creating a destination data structure in memory that is automatically populated with data from a source data structure. FIG. 8 is an exemplary lookup table illustrating information used when mapping the data into particular fields in the destination data structure. FIG. 9 is a flow diagram illustrating the preferred method for mapping the data from fields in the source data structure to particular fields in the destination data structure. FIG. 10 is a flow diagram illustrating the preferred method for transforming the data from each of the source fields into richly formatted text in one of the fields of the destination data structure.

As mentioned above with regard to FIG. 1, the preferred embodiment of the present invention is the DTIM program module 37a which allows users to manage their own appointments, tasks or "to-do" list, notes, contacts, recorded journal items, and electronic mail messages via different program modules internal to the DTIM program module 37a. Each program module maintains information or data using a distinct type of data structure in memory. Examples of such types of data structures are mail messages and appointments.

The DTIM program module 37a allows a user to easily create a new item (such as a new appointment) maintained in a destination data structure that is populated with information from an existing item (such as a mail message) maintained in a source data structure using a drag and drop operation. In this manner, a user is able to advantageously create the destination data structure already populated with the existing information without having to manually re-enter the information into each field of the destination data structure.

Figure 3A:
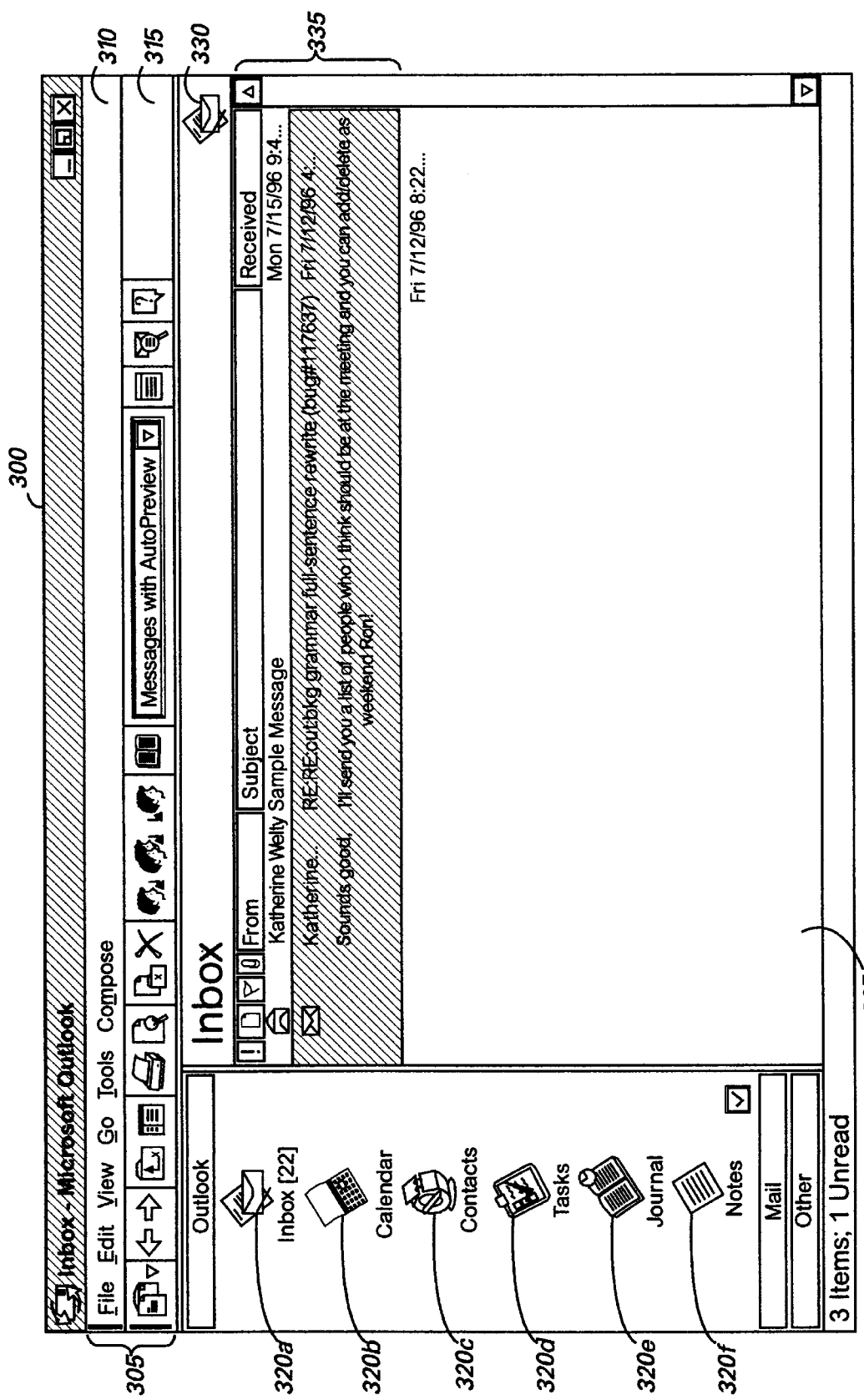
FIG. 3, consisting of FIGS. 3A–3E, are screen displays for supporting drag and drop coercion from inside the preferred program in accordance with the preferred embodiment of the present invention.
Figure 3B:
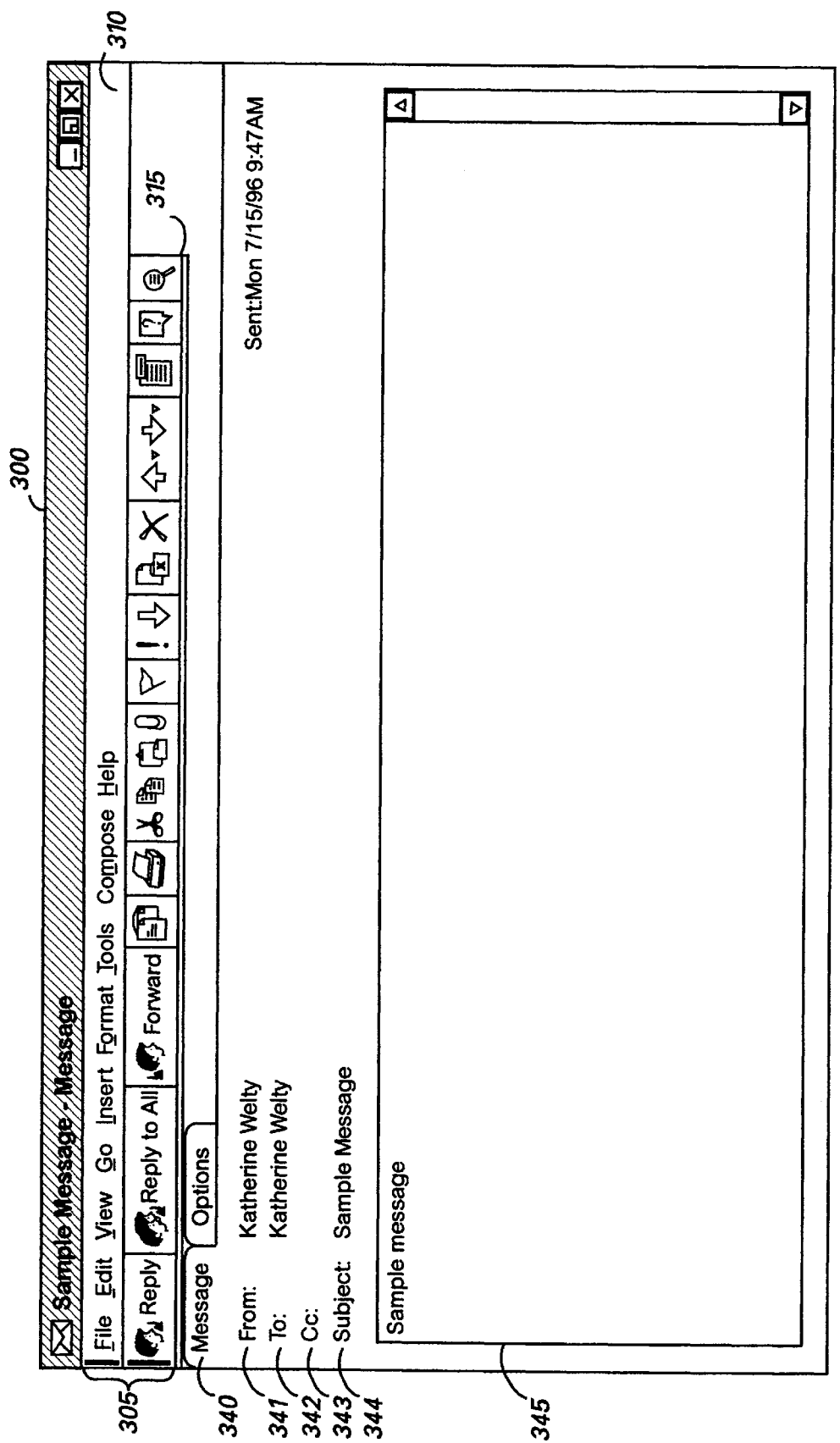
Figure 3C:
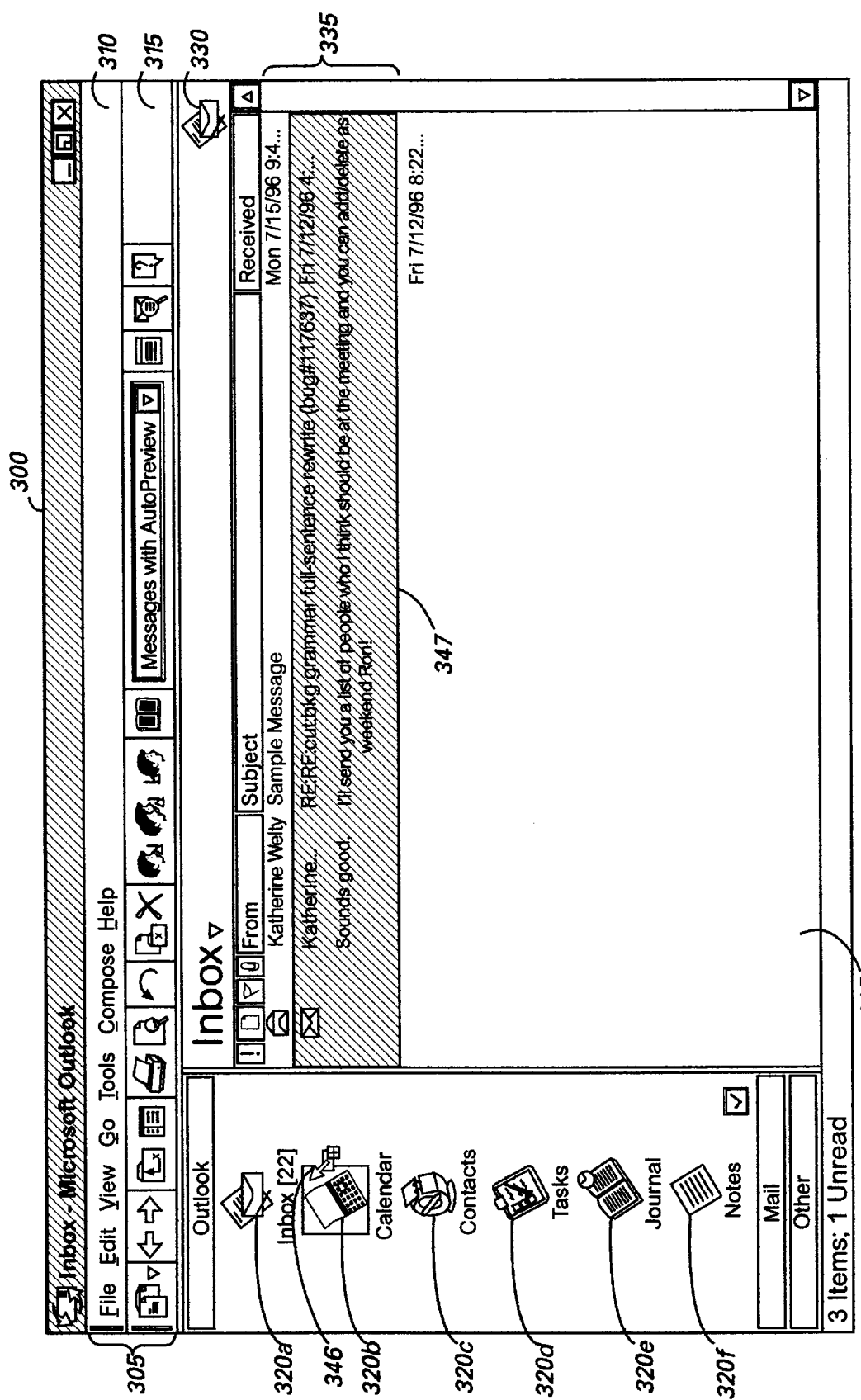
Figure 3D:
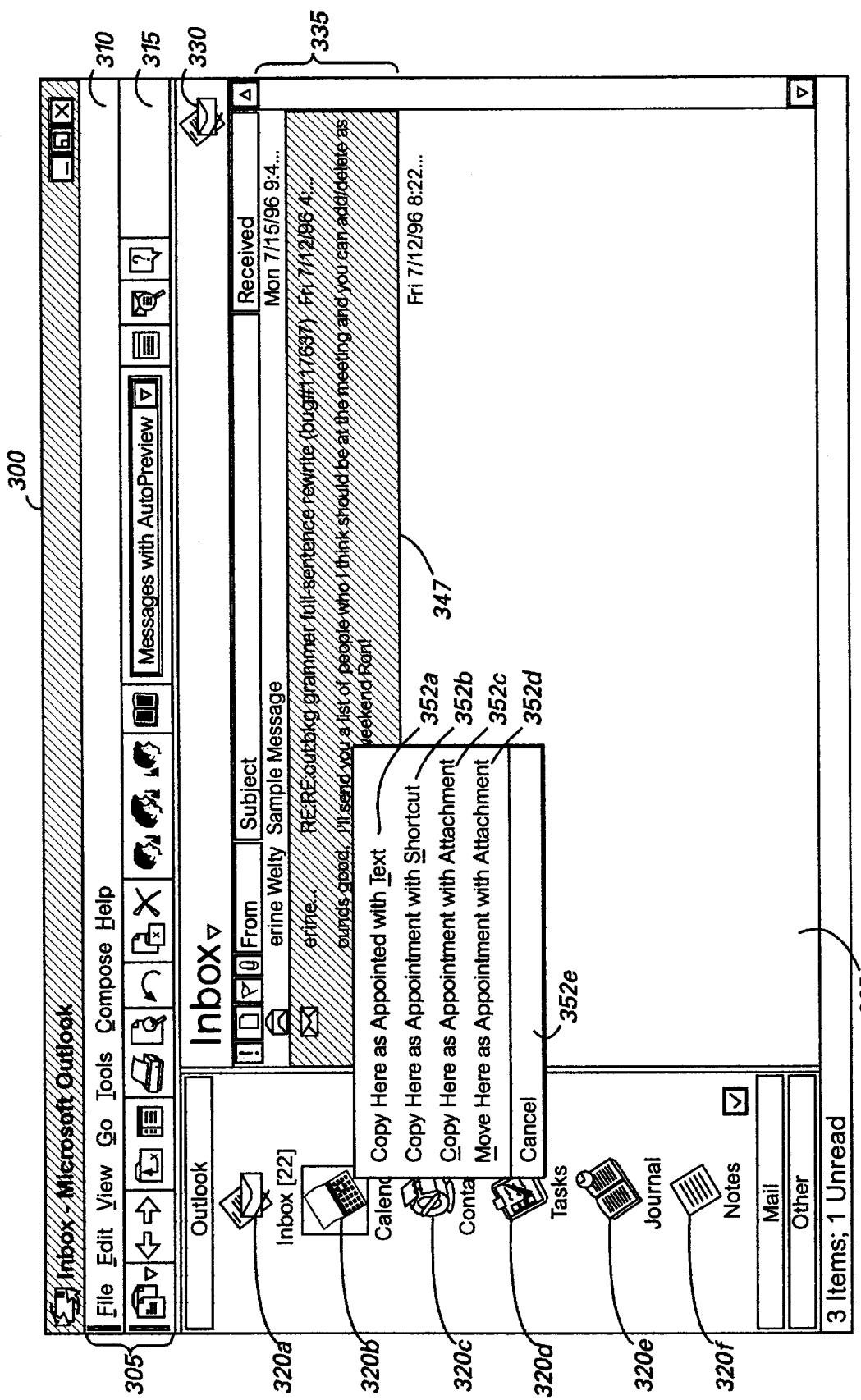
Figure 3E:
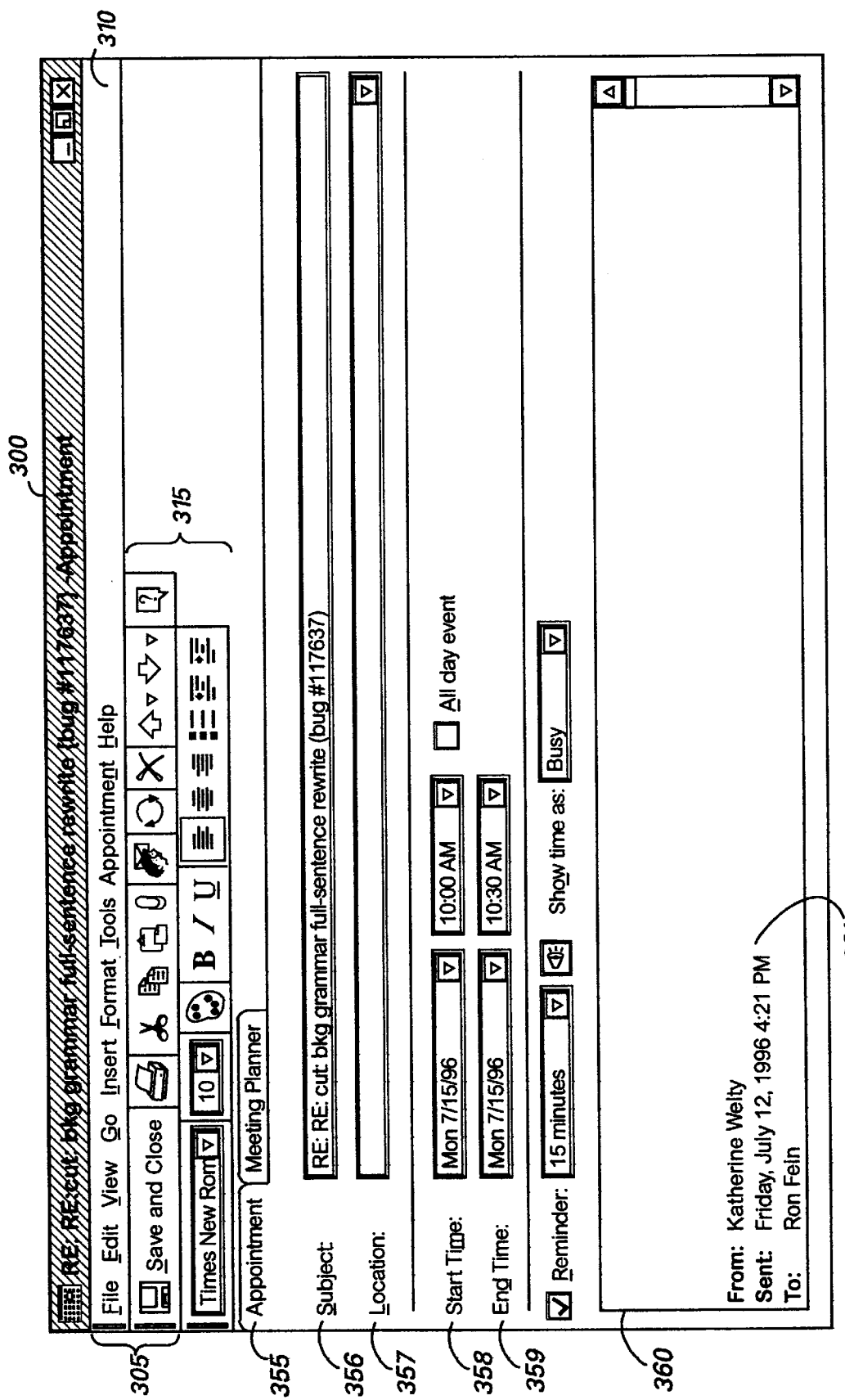

FIGS. 3A–3F and FIGS. 4A–4B are collectively referred to as screen displays encountered by a user of the DTIM program module 37a on the monitor 31 of the computer 10 in the preferred embodiment of the present invention. Referring now to FIGS. 1 and 3A, a window 300 associated with the DTIM program module 37a is displayed on the monitor 31. A menu bar 305, which includes a variety of commands 310 representing pull down menus of functions and icon buttons 315 representing a specific function, is displayed along the top edge of the window 300.

As previously mentioned, the DTIM program module 37a has different program modules that manage appointments, tasks or "to-do" list, notes, contacts, recorded journal items, and electronic mail messages. These different program modules are represented within the window 300 by a series of graphical icons 320a–f, including an Inbox icon 320a, a Calendar icon 320b, a Contact icon 320c, a Task icon 320d, a Journal icon 320e, and a Notes icon 320f. The Inbox icon 320a is associated with a program module internal to the DTIM program module 37a that manages mail messages. The Calendar icon 320b is associated with a program module internal to the DTIM program module 37a that manages appointments. The Contact icon 320c is associated with a program module internal to the DTIM program module 37a that manages contacts. The Task icon 320d is associated with a program module internal to the DTIM program module 37a that manages tasks or a "to-do" list. The Journal icon 320e is associated with a program module internal to the DTIM program module 37a that records journal items (information about important items, such as important electronic mail, important meetings, etc.). The Notes icon 320f is associated with a program module internal to the DTIM program module 37a for creating a note or simple text document. Those skilled in the art will recognize that these graphical icons 320a–f are exemplary and that the present invention is not limited to the specific program modules associated with these exemplary icons 320a–f.

The icons 320a–f can be selected by positioning a cursor with the mouse 29 and pressing a button on the mouse 29. When one of the icons 320a is selected, a view area 325 within the window 300 displays a title bar 330, indicating the name of the program module associated with the selected icon 320a, and representations 335 of a certain type of item or data structure associated with the program module. For example, when the Inbox icon 320a is selected by the user, the program module that manages the mail messages displays the "Inbox" name in the title bar 330 and representations 335 of mail messages (a type of data structure). In this manner, a user is shown representations 335 of different mail messages which can be individually selected and viewed by double-clicking on one of the representations 335.

FIG. 3B is a screen display illustrating the contents of a mail message in a message form 340 within the window 300. Referring now to FIGS. 1, 3A, and 3B, the message form 340 appears on the monitor 31 within the window 300 in response to selecting or double-clicking on one of the representations 335 of the mail messages. The message form 340 shows each field of the selected mail message to the user and is used when viewing or editing the data within each field of the mail message. In the preferred embodiment, there are fields in the message form 340 containing information on who is sending or receiving the mail message, such as a "From" field 341, a "To" field 342, and a "Cc" field 343. A "Subject" field 344 in the message form 340 contains information on the subject of the mail message. A body field 345 contains the main text of the mail message.

FIG. 3C is a screen display illustrating the selection, dragging, and dropping of a mail message onto an icon representing one of the program modules internal to the DTIM program module 37a using a left-hand button on the mouse 29. Referring now to FIGS. 1, 3A, and 3C, the program module that manages mail messages within the DTIM program module 37a displays the different representations 335 of mail messages in the view area 325, similar to the illustration in FIG. 3A.

In the preferred embodiment of the present invention, a new item can be easily and efficiently created by manipulating the mouse 29 to position a cursor 346 over the existing item, selecting the existing item using a button on the mouse 29, and dragging the existing item over an icon 320b representing the program module associated with the type of the new item before dropping the existing item. For example, the user may want to create a new appointment from the data within a mail message. The user manipulates the mouse 29 to position the cursor 346 over a representation 347 of one of the mail messages displayed in the view area 325. The representation 347 of the mail message is selected when the left-hand button on the mouse 29 is pressed. A drag is performed, while still pressing the left-hand button on the mouse 29, to move the cursor 346 over the Calendar icon 320b. When the left-hand button is released on the mouse 29, the selected mail message is symbolically "dropped" onto the program module that manages appointments (i.e., the program module associated with the Calendar icon 320b). In response to the drop operation, the program module that manages appointments automatically creates a new appointment using information from fields of the selected mail message if the user selected, dragged and dropped using the left-hand button on the mouse 29. The determination of which field of the selected mail message contains information that populates a specific field of the appointment is governed by the types of data structures associated with the items, i.e., a mail message type and the appointment type.

Thus, use of the left-hand button on the mouse 29 with the select, drag, and drop operation results in an automatic transformation or coercion of the existing mail message into a new appointment. However, if the right-hand button on the mouse 29 is used during the above-described select, drag, and drop operation, the user is given a menu of choices as to how the information in the existing item, such as the mail message, will be used by the new item, such as the new appointment.

FIG. 3D is a screen display illustrating the dropping of a mail message onto an icon 320b representing one of the program modules internal to the DTIM program module 37a using the right-hand button on the mouse 29. Referring now to FIGS. 1, 3C, and 3D, a menu 350 of commands 352a–e is displayed on the monitor 31 in response to a drop operation using the right-hand button on the mouse 29. Aside from the Cancel command 352e that aborts the entire process, each of the commands 352a–d invokes functions that populate the new item in a particular manner. This gives the user more flexibility on how the new item will use the existing information in the existing item to populate the fields of the new item.

Some of the commands are designated "Copy" commands and some are designated "Move" commands. In general, a "Copy" command merely copies the information contained in the fields of the existing item into specific fields of the new item. However, a "Move" command will go further and delete the original existing item (or move the original existing item to a conventional "Waste Basket" folder) after creating the new item and populating it according to the rest of the command.

The top command 352a in the menu 350 is conventionally the default command that is invoked and executed when the left-hand button of the mouse 29 is used for the select, drag, and drop operation. In this example, the top command 352 in the exemplary menu 350 is "Copy Here as Appointment with Text." When this command is executed, the information or data contained within fields of the existing item (the mail message) is copied to populate specific fields of the new item (the appointment). Information within each printable field of the existing item is then formatted into a predetermined rich text format (RTF), including bold type, italics, indention, spacing, etc., as if the existing item was being printed. The formatted data is then inserted into one of the fields of the new item, preferably the body field, to yield what is called a "textized" version of the existing item. Producing the "textized" version of the existing item and inserting it into the new item advantageously preserves the entire printable content of the existing item in a rich format, within the new item.

The next command 352b in the exemplary menu 350 is "Copy Here as Appointment with Shortcut." When this command is selected by the user, the information or data contained within fields of the existing item is also copied to populate specific fields of the new item. Additionally, a pointer, displayed as an icon, is inserted into the body field of the new item as a "shortcut" mechanism. This pointer maintains a path to the existing item and allows the user to easily click on the icon to display the existing item in the appropriate form on the monitor 31.

The next command 352c in the exemplary menu 350 is "Copy Here as Appointment with Attachment." When this command is selected by the user, the information or data contained within fields of the existing item is again copied to populate specific fields of the new item. Additionally, a copy of the existing item is attached to the new item and a pointer, displayed as an icon, is inserted into the body field of the new item as an "attachment" mechanism. This pointer maintains a path to the attachment, i.e., the copy of the existing item, and allows the user to easily click on the icon to display the copied existing item in the appropriate form on the monitor 31.

The last command 352d in the exemplary menu 350 before the Cancel command 352e is "Move Here as Appointment with Attachment." This command is similar to the previous command 352c with the additional step of deleting the existing item after the fields of the new item are populated with data from the existing item. In the preferred embodiment, deleting is defined as moving the existing item into a temporary storage folder conventionally called a "Waste Basket". The existing item is copied as an attachment and a pointer is inserted in the body field of the new item.

Thus, the select, drag, and drop operation using the righthand button of the mouse 29 allows the user to customize how the transformation of data from the existing item to the new item will take place. The present invention is not limited to the above-discussed commands in the exemplary menu 350. Those skilled in the art will recognize that the commands 320a–e will vary according to type of the existing item and the type of the new item.

FIG. 3E is a screen display illustrating data within the fields of the new appointment item after being created, according to the preferred embodiment of the present invention, from data within the existing mail message item. Referring now to FIG. 1, 3A, 3B, 3D, and 3E, an appointment form 355 is displayed within the window 300 on the monitor 31 after the new appointment item has been created and populated with data according to the "Copy Here as Appointment with Text" command 352a, as discussed above. The appointment form 355, similar to the message form 340, has a variety of fields displayed on the monitor 31 for viewing and editing the transformed data that populates each field of the appointment form 355. In the preferred embodiment, the appointment form 355 has a "Subject" field 356, a "Location" field 357, a "Start Time" field 358, an "End Time" field 359, and a body field 360. The "Subject" field in the appointment form 355 is shown populated with data from the "Subject" field 344 of the existing mail message. The exact mapping of which data from the existing item is transferred or transformed into a specific field in the new item depends upon the types of the existing item and the new item, i.e., the types of data structures that maintain these items. For example, certain fields in a mail message item would map over or would be used to populate certain other fields within a new appointment item. However, different fields in the mail message item may be used to populate fields within another kind of new item, such as a task item or a contact item. In this manner, the DTIM program module 37a optimally uses the already existing information in the existing item when creating a new item using the preferred embodiment of the present invention.

The body field 360 of the appointment form 355 is shown populated with a "textized" version 361 of the data within the existing mail message. As mentioned above with regard to FIG. 3D, the "textized" version of the existing data is essentially data from each of the fields 340–345 of the existing mail message that can be printed in a rich text format. Thus, the "textized" version is basically formatted to look as if the existing mail message item was printed and then inserted into the body of the new appointment item and displayed in the body field 360 of the appointment form 355.

Although not shown in FIG. 3E, a pointer icon (not shown) would appear, preferably at the top, within the body field 360 of the appointment item as a "shortcut" mechanism or "attachment" mechanism if the "Copy Here as Appointment with Shortcut" command 352b or the "Copy Here as Appointment with Attachment" command 352c, respectively, was chosen from the exemplary menu 350.

Summarizing from a user's perspective, a user can manipulate the mouse to perform a select, drag, and drop of a representation of the existing item within the DTIM program module 37a over an icon displayed on the monitor 31. If the icon and the existing item are associated with the same type of item, an ordinary move or copy operation is initiated. However, if the icon and existing item correspond to different types of items, a new item is created that is advantageously populated with data from the specific fields of the existing item. The data within the existing item is optimally and efficiently transferred or transformed when creating the new item, rather than forcing the user to manually enter the data or perform subsequent cut and paste operations. Therefore, the user is presented with a new item in a form within the window 300 already populated with data in fields of the new item that the user can edit and then store away on one of the memory storage devices.

As previously mentioned, the preferred embodiment of the present invention can use an existing item that was not created by the DTIM program module 37a. The preferred embodiment allows the existing item to be maintained as any document, such as the document 38 shown in FIG. 5 as discussed below, that supports the Object Linking and Embedding (OLE) 2.0 standard protocol and functions designed and marketed by the Microsoft Corporation regarding drag and drop operations. Those skilled in the art will be familiar with the features, functions, and protocol of standard OLE 2.0 application programming interfaces for drag and drop operations. Additional details of OLE 2.0 can be obtained by referring to "Inside OLE 2" by Kraig Brockschmidt or by referring to "OLE 2.0 Programmers Reference", both published by Microsoft Press.

FIGS. 4A and 4B are screen displays encountered by the user of the DTIM program module 37a on the monitor 31 when creating a new item populated with data from a document created by the external application program module 37b (i.e., external to the DTIM program module 37a). Referring now to FIGS. 1, 3C, 3D, and 4A, the contents of a document 38 are displayed on the monitor 31 by the external application program module 37b. In this example, the document 38 contains the text 405 of a status report and lists several tasks or followup actions. One of the first tasks listed in the document 38 is illustrated as highlighted or selected text 410. To create a new task item in the DTIM program module 37a, the user merely drags the selected text 410 onto the task icon 320d associated with a program module that manages tasks or a "to-do" list within the DTIM program module 37a. Once the selected text 410 from the document 38 has been dropped on the task icon 320d, the process of creating a new item populated with data from specific fields of an existing item (the selected text 410 from the document 38) is the same as described above with regard to FIGS. 3C and 3D.

FIG. 4B is a screen display illustrating a new task item created and populated with data from the selected text 410 of the document 38. Referring now to FIGS. 1, 4A, and 4B, the new task item is shown in a task form 415 having a variety of fields. A "Notes" field 420 of the task form 415 is shown containing the transformed data 425 from the existing item (i.e., the selected text 410 from the document 38). Thus, any selected data within the document 38 may be "coerced" resulting in a new item or data structure populated with the selected data. Furthermore, the entire document 38 may be coerced resulting in the new item or data structure populated with all of the data maintained within the document 38.

Those of skill in the art will appreciate that if the document 38 is a data structure having data maintained in distinct fields rather than just one field of text, the preferred embodiment of the present invention is able to handle this situation by being extensible. In other words, the DTIM program module 37a allows for handling other types of items or data structures. The DTIM program module 37a could be modified to recognize which fields in a new type of existing data structure, such as the document 38, would map to or populate a specific field in a new item maintained in destination data structure. In this manner, existing information in items or data structures created by the DTIM program module 37a or created by any other external application program module 37b supporting conventional drag and drop operations can be optimally utilized to populate the fields of a new item or data structure.

Beneath the user-interface of the DTIM program module 37a, there are a variety of components comprising interacting program modules and data structures in the preferred embodiment of the present invention. FIG. 5 is a block diagram illustrating the preferred components for creating a destination data structure in memory populated with data from a source data structure or from a document. The new items and existing items used and created by the DTIM program module 37a that are discussed with regard to FIGS. 3A–3E and FIGS. 4A–B, are stored in memory as data structures. In the context of the present invention, an existing item (such as the mail message item of FIG. 3B) is stored as and referred to as the source data structure. Similarly, a new item (such as the appointment item of FIG. 3E) is stored as and referred to as the destination data structure.

Referring now to FIGS. 1, 3B, 3E, and 5, the DTIM program module 37a is made up of different internal program modules that implement the different management functionalities, such as managing mail messages, managing appointments in a calendar, etc. Two of the different internal program modules associated with the DTIM program module 37a are generally illustrated as a source program module 505 and a destination program module 510.

The source program module 505 is one of the internal program modules that creates the source data structure 39 (i.e., the data structure maintaining the existing data of the existing item). In the preferred embodiment, the internal program modules within the DTIM program module 37a include six exemplary program modules, each with their own type of data structure that they create and manage.

A task program module creates and manages a "to-do" list of individual tasks. A journal program module creates and manages records of important actions and events, such as important mail messages and important meetings. A contact program module creates and manages information about a personal contact, such as their name and address. A notes program module creates and manages free form text information. An electronic mail program module creates and manages mail messages sent and received by the user. A calendar program module creates and manages the schedule of appointments for a user.

It is important to recognize that the present invention should not be limited to these specific examples of internal program modules within the DTIM program module 37a. It is more important to understand and recognize that any of these internal program modules may be labeled as the source program module 505 or the destination program module 510 in the preferred embodiment of the present invention.

The source data structure 39 has various fields, also known as properties, which maintain data. The data is entered in the above-described fields in the forms displayed on the user-interface for an item, such as the body field 360 of the appointment form 355. The "source" label is used on the source data structure 39 and the source program module 505 to intuitively identify those components associated with the existing data from which a destination data structure 40 is created.

The destination program module 510 is another of the internal program modules, similar to the source program module 505. The destination program module 510 is the component within the DTIM program module 37a that actually creates the destination data structure 40 in memory. In the example from FIG. 3C, the destination program module 510 is the calendar program module within the DTIM program module 37a represented by the Calendar icon 320b. The destination data structure 40 has various fields, also known as properties, in which to maintain data. Again, referring to the example from FIG. 3C, the destination data structure 40 is the data structure in memory that maintains the data from each field 356–360 of the appointment form 355 corresponding to the new appointment item. The "destination" label is used on the destination data structure 40 and the destination program module 510 to intuitively identify those components responsible for creating the new data structure, populating the new data structure with existing data, and the new data structure itself, i.e., the destination data structure 40.

In the preferred embodiment, a Messaging Application Programming Interface (MAPI) store is used when implementing the source data structure 39 and the destination data structure 40. Those skilled in the art will recognize that MAPI is a set of APIs customized for object-oriented operations on electronic messages, such as opening, closing, sending, receiving, and storing. These APIs are supported by the operating system 36 and the DTIM program module 37a.

In general, the internal program modules (such as the source program module 505 and the destination program module 510) within the DTIM program module 37b preferably maintain data in MAPI data structures, which are essentially objects in an extensible, object-oriented database called a MAPI store. Each of these MAPI data structures preferably includes one or more fields or properties in which to maintain the data within the MAPI data structure. The MAPI data sturcture also identifies the type of MAPI data structure, such as mail message type of MAPI data structure, via a type tag associated with the MAPI data structure. The data maintained within the fields of the MAPI data structure can be preferably viewed using a MAPI form, such as the message form 340 or the appointment form 355.

Although the preferred embodiment uses MAPI as a data storage mechanism, the present invention is not limited to this implementation. One skilled in the art will recognize that other data structure storage subsystems may be used to store and link information, including but not limited to OLE automation, file allocation table (FAT) folders, and databases accessed vis open database connectivity (ODBC).

For additional information regarding MAPI, the reader may refer to the MAPI documentation, entitled Messaging Application Programming Interface (MAPI) version 1.0, which is published by Microsoft Corporation, and which is incorporated herein by reference.

In the preferred embodiment of the present invention, the destination program module 510 essentially creates the destination data structure 40 in response to an OLE 2.0 drag and drop operation involving the source data structure 39. When a representation of the source data structure 39 is graphically selected by the user and is dragged over an icon, such as the Calendar icon 320b, the type of the source data structure 39 is determined. When the representation of the destination program module 510, the destination program module 510 compares the type of data structure is creates (i.e., the type of the destination data structure 40) and the type of the source data structure 39. If the data structure types are the same, then a conventional copy/move operation occurs in accordance with the OLE 2.0 drag and drop operations and no coercion takes place. However, if the data structure types are different, then data from the source data structure 39 is coerced into a new data structure (the destination data structure 40) in memory.

Once the destination data structure 40 is created in memory, data is transformed from the source data structure 39 and transferred into fields of the destination data structure 40 to populate the destination data structure 40. The exact functions used to transform the data in the source data structure 39 preferably depends on how the select, drag, and drop operations were performed. In the preferred embodiment, if the select, drag, and drop operations utilized the left-hand button on the mouse 29, then the destination program module 510 automatically executes one or more predetermined transform functions associated with a default command. However, if the right-hand button on the mouse 29 is utilized, then the destination program module 510 displays a menu of commands, such as the exemplary menu 350 illustrated in FIG. 3D.

After a desired command from the menu 350 has been selected or the default command is automatically selected, the destination program module 510 executes the transform functions associated with the desired command. One skilled in the art will recognize the ability to create different commands associated with certain desired transform functions to meet their needs. In the preferred embodiment, the selection of which transform functions are associated with specific commands was chosen by convention and should not be considered to be limiting to the present invention.

In the preferred embodiment, there are four distinct kinds of transform functions that implement different ways of populating fields of the destination data structure 40 with data from the source data structure 39. These preferred transform functions comprise a field function, a "textizing" function, a shortcut function, and an attachment function. The field function utilizes a lookup table 515 to map the fields of a particular type of source data structure 39 into corresponding fields of a particular type of destination data structure 40. The field function uses the lookup table 515 to perform this mapping information depending on the type of the source data structure 39 and the type of the destination data structure 40. An example of how this lookup table is used is discussed in more detail below with regards to FIGS. 8 and 9.

The "textizing" function generates a rich text format version of the printable data from each field of the source data structure 39. In the preferred embodiment, this formatted version of the data includes all bold type, italics, indention, and fonts used as if the data in the source data structure 39 was being printed. This advantageously gives the user a "what-you-see-is-what-you-get" (WYSIWYG) version of the data from the source data structure 39. The formatted data is inserted into one of the fields, preferably the body field 360, of the destination data structure 40.

The shortcut function inserts a "link" within one of the fields, preferably a body field 360, of the destination data structure 40. Essentially, the link provides a path (i.e., a shortcut way to reference) to the source data structure 39. Additionally, the shortcut function inserts an icon along with the link in the fields of the destination data structure 40. In this manner, the user can click on the shortcut icon and the destination program module 510 will find and display the contents of the source data structure 39 in the appropriate form on the monitor 31. Similar to the shortcut function, the attachment function attaches a copy of the entire source data structure 39 to the destination data structure 40.

Although the creation and population of the destination data structure 40 has been discussed in terms of a single source data structure 39, the preferred embodiment of the present invention allows multiple source data structures to be selected and used as sources when populating a new or destination data structure 40. Essentially, much of the same process is used with the exception of when the type of source data structure must be determined. If the group of source data structures is homogenous in type, then that type of data structure is used when comparing it to the type of the destination data structure 40. If the group is a heterogeneous selection of source data structures, then a general type of data structure is designated to be the type of the source data structures 39 when compared to the destination data structure. In the preferred embodiment, a general type of data structure is a mail message type of data structure because of the MAPI implementation of the source data structure and the destination data structure. The data from each of the group of source data structures is then used to populate the destination data structure 40. Although the data from each source data structure in the group can be mapped into fields of the destination data structure 40, it is preferable to populate the destination data structure by attaching copies of the source data structures to the destination data structure 40.

As previously mentioned, a document 38 created by an external application program module 37b can also be used, according to the above description, as the source (or source data structure 39) when creating and populating the destination data structure 40 according to the present invention. Instead of comparing the type of the source data structure 39 to the destination data structure 40, the type of the document 38 is compared to the destination data structure 40 in response to an OLE 2.0 drop operation of a representation of the document 38 or a part of the document 38 onto a representation of the destination program module 510. Those skilled in the art will appreciate that any document 38 that supports drag and drop operations under OLE 2.0 can operate in this manner with the preferred embodiment of the present invention.

FIG. 6 is a flow diagram illustrating steps of the preferred method for creating the destination data structure 40 in memory populated with data from the source data structure 39. Referring now to FIGS. 1, 3C, 5, and 6, the preferred method 600 begins at step 605 where the source data structure 39 is selected. This selection step preferably is accomplished when a representation of the source data structure 39, such as the representation 347 of one of the mail messages, is selected using a button of the mouse 29. At step 610, the user drags the selected source data structure 39, while still pressing the button on the mouse 29, over a representation of the destination program module 510, such as the Calendar icon 320b. At step 615, the selected source data structure 39 is dropped onto the representation of the destination program module 510, such as the Calendar icon 320b. This is preferably accomplished by releasing the button of the mouse 29 while maintaining the position of the cursor 346 over the representation of the destination program module 510.

In general, the steps of 605–615 describe a preferred operation between the source data structure 39 and the destination program module 510, i.e., a select, drag, and drop operation. While the preferred embodiment of the present invention is implemented with this preferred operation, the present invention is not limited to a specific kind of operation in steps 605–615 between the source data structure 39 and the destination program module 510. It is important to understand that other operations between the source data structure 39 and the destination program module 510 may be used with the present invention. An example of another such operation is the receipt of a mail message (source data structure) by an electronic mail program module (destination program module) in addition to the previously mentioned copy/paste operations, and direct menu command operations.

At step 625, if the type of data structure associated with the destination program module 510 is the same as the type of the source data structure 39, then step 625 proceeds to step 630 because there is not need to coerce a new data structure. As a result, a simple move or copy file-type operation is performed on the source data structure 39 at step 630. Basically, a copy operation would copy the source data structure 39 into a folder associated with the destination program module 510 on the hard disk drive 20. A move operation would copy the source data structure 39, similar to the above-described copy operation, but would further delete the original instance of the source data structure 39 from within memory. After step 630, the preferred method 600 terminates.

Otherwise, at step 625, if the type of data structure associated with the destination program module 510 is different than the type of the source data structure 39, then step 625 proceeds to step 635. In general, steps 635–640 represent the steps performed when a new or destination data structure 40 is coerced from the existing data within the source data structure 39. At step 635, the destination data structure 40 is created in memory by the destination program module 510. The destination data structure 40 is a data structure with fields in which to maintain data. The destination data structure 40 is a data structure of the type associated with the destination program module 510. For example, if the destination program module 510 is an internal program module that manages calendar appointments, then the created destination data structure 40 is an appointment type of data structure.

At step 640, predetermined fields of the destination data structure 40 are populated with data from specific fields of the source data structure 39. The exact data used to populate the fields of the destination data structure 40 depends upon the type of the source data structure 39 and the type of the destination data structure 40. For example, if the source data structure 39 contains information about a specific mail message and the destination data structure 40 is an appointment type of data structure, the information in each field of the mail message will translate or be transformed into certain predetermined fields of the new appointment (contained in fields of the destination data structure 40).

At step 645, the information maintained within each of the fields of the destination data structure 40 is displayed on the monitor 31 of the computer 10 within a form, such as the appointment form 355. In this manner, the user is able to see the results of the coercion process of the preferred method 600, i.e., the populated fields of the destination data structure 40, and make any desired changes before saving the destination data structure 40 to non-volatile memory, such as the hard disk drive 20.

In summary, the destination data structure 40 is created and efficiently populated with the proper existing data from the source data structure in response to a user operation, such as a drag and drop operation, and a comparison of types of data structures. In this manner, the user avoids the lengthy process of either (1) manually entering the same existing data into each appropriate field of the destination data structure 40 or (2) repetitively cutting and pasting existing data from fields of the source data structure 39 to fields of the destination data structure 40.

FIG. 7, consisting of FIGS. 7A–7C, is a more detailed flow diagram illustrating steps of the preferred method for creating a destination data structure in memory populated with data from a source data structure using drag and drop techniques. Although embodiments of the present invention have been discussed using a single source data structure 39 from which to create and populate a destination data structure, the present invention also contemplates using more than one source data structure. FIG. 7 supports a review of such an embodiment of the present invention.

Referring now to FIGS. 1, 3C, 5, and 7A, the preferred method 700 begins at step 702 where a representation of one or more source data structures 39 is selected by a computer user preferably by manipulating a button on the mouse 29. At step 704, a selection signal is received corresponding to the button down operation of the mouse 29. In the preferred embodiment, the selection signal is a message sent by the operating system 36 to the DTIM program module 37a.

In general, the window procedure receives mouse messages from the operating system 36 whenever the mouse cursor 346 passes over the window 300 or a button on the mouse 29 is clicked within the window 300. The operating system 36 posts a $WM_{13}MOUSEMOVE$ message to the DTIM program module 37a when the cursor is moved over the window 300. When the user presses or releases the left mouse button while the cursor 346 is in the window 300, the operating system 36 posts a $WM_{13}LBUTTONDOWN$ or $WM_{13}LBUTTONUP$ message, respectively, to the window 300. Similarly, a $WM_{13}RBUTTONDOWN$ or a $WM_{13}RBUTTONUP$ message is posted by the operating system 36 when the user presses or releases, respectively, the right mouse button while the cursor is in the window 300.

The $WM_{13}LBUTTONDOWN$, $WM_{13}LBUTTONUP$, $WM_{13}RBUTTONDOWN$, and $WM_{13}RBUTTONUP$ messages each include two parameters known as lParam and wParam. The lParam parameter indicates the position of the mouse cursor 346. The low order word of the lParam indicates the x-coordinate, and the high-order word of the lParam indicates the y-coordinate. The coordinates are given in "client coordinates", where the position is relative to the upper left corner of the client area of the window 300. The wParam parameter contains flags that indicate the states of the buttons on the mouse 29 and the SHIFT and CNTRL keys on the keyboard 28. These are checked when mouse message processing depends on the state of the other mouse button or of the SHIFT and CNTRL keys.

At step 706, the user begins to drag the representation of the source data structures 39 while still pressing the button on the mouse 29. During the drag operation, information regarding the one or more source data structures 39 is determined at step 708. This information is preferably called "ItemClip Info" for each of the source data structures and comprises a type tag, an entry identification, a pointer, and a folder related to the source data structure 39.

Essentially, the type tag is a data structure type identifier, preferably implemented as a string, such as ipm.note for data structures that are mail messages or ipm.appt for data structures that are appointments. The type tag or string identifies the MAPI message class for the source data structure 39. In other words, the type tag is what identifies the type of the source data structure 39. The entry identification is a unique MAPI identifier for the source data structure 39 where the pointer holds the memory address for the source data structure 39. The folder is the identified MAPI container where the source data structure 39 lies within memory. Thus, the ItemClip Info is determined for each of the selected source data structures 39 and temporarily maintained in an array within RAM 17 during the drag operation.

At step 710, the representation of the selected source data structures 39 is dragged over an icon, such as the Calendar icon 320*b,* representing the destination program module 510. At step 712, the representation of the selected source data structures 39 is then dropped onto the icon representing the destination program module 510. When the drop operation occurs by releasing the pressed button on the mouse 29, the DTIM program module 37*a* receives a drop signal from operating system 36 at step 714 in the form of one of the mouse messages previously described. In this manner, the DTIM program module 37*a* is informed about an operation (such as the preferable drop operation) between the source data structure 39 and the destination program module 510.

Essentially, steps 716–720 handle the situation where multiple source data structures were selected at step 702 to be sources of data for the new destination data structure 40. At step 716, if more than one source data structure 39 was selected at step 702, then step 716 proceeds to step 718. However, if only one source data structure 39 was selected at step 702, then step 716 proceeds directly to step 722 on FIG. 7B.

At step 718, each of the selected source data structures 39 are compared to each other to see if they are all of the same type. If they are all of the same type of data structure, then step 718 proceeds directly to step 722 on FIG. 7B. However, if the selected source data structures 39 are not all of the same type of data structure, step 718 proceeds to step 720 on FIG. 7B.

Referring now to FIGS. 1, 3C, 3D, 3E, 5, and 7B, the preferred method 700 continues at step 720 where all of the selected source data structures 39 are assumed to have a general type of data structure. This is preferably implemented by changing the type tag for each of the source data structures 39 to indicate a mail message type of data structure (i.e., a general type of data structure).

At step 722, a comparison is made by the destination program module 510 between the type tags for each of the selected source data structures 39 (source type tags) and the type tag associated with the destination program module 510 (destination type tag). The destination program module 510 inherently knows the destination type tag because any data structures the destination program module 510 creates have this characteristic type tag or message class identifying the type of the data structure. If the source type tags are the same as the destination type tag, then step 722 proceeds to step 724 where a conventional move/copy operation is performed on each of the selected source data structures 39. However, if the source type tags are not the same as the destination type tag, step 722 proceeds to step 726.

Steps 726–754 are essentially the steps involved when coercing the destination data structure 40 from the data within the source data structures 39. At step 726, if the mouse button used in steps 702–712 when selecting the source data structures 39 is the right-hand button, then step 726 proceeds to step 728 where a menu 350 of possible commands is displayed on the monitor 31. The content of the menu 350, i.e., the commands 352*a–e,* depends upon the type of the source data structures 39 and the destination type tag. Essentially each of the commands 352*a–e* are created by the destination program module 510 and associated with predetermined transform functions.

At step 730, the user selects one of the commands 352*a–e* from the displayed menu 350. As previously mentioned, each of the commands 352*a–e,* aside from the Cancel command 352*e,* executes transform functions associated with the command to populate the destination data structure 40 with data from the source data structure 39 in a particular manner.

At step 732, a command signal, preferably one of the mouse messages, is generated by the operating system 36 and received by the DTIM program module 37*a* indicating that one of the commands 352*a–e* has been selected from the menu 350 before proceeding to step 736. Those skilled in the art will recognize that steps 728–732 allow a user to selectively choose how the existing data within a source data structure 39 will populate the fields of the destination data structure 40 as opposed to using default transform functions.

Referring back to step 726, if the mouse button used in steps 702–712 is the left-hand button, an automatic or default selection of one of the commands 352*a–e* (associated with default transform functions) occurs in step 734 based upon the source type tags and the destination type tag at step 734 before proceeding to step 736. Thus, the default selection, invoked when using the left-hand mouse button, provides an added measure of efficiency for a user trying to create a new data structure populated with existing data maintained within fields of another data structure in the most common or desirable way.

At step 736, the destination program module 510 determines the predetermined transform functions corresponding to the selected command. The transform functions corresponding to the selected command are determined by calling a function that references a lookup table. The transform functions which are executed for a specific command is returned by the function.

At step 738, the destination data structure 40 is created in memory by the destination program module 510 having the characteristic destination type tag associated with the destination program module 510. At this point, the destination data structure 40 is merely instantiated as a data structure or object in memory but without any of the existing data in the fields of the destination data structure 40 before proceeding to step 740.

Referring now to FIGS. 1, 3C, 3D, 3E, 5, and 7C, the preferred method 700 continues with steps 740–756 where the different transform functions associated with the selected command are executed. It is through these transform functions that data from each of the source data structures 39 populates specific fields in the destination data structure. At step 740, if the determined transform functions include a field function, then data from fields of each source data structure 39 are mapped into specific fields of the destination data structure 40 at step 742. The field function is described in more detail below with regard to FIGS. 8 and 9. If the determined transform functions do not include the field function, step 740 proceeds to step 744.

At step 744, if the determined transform functions include a "textizing" function, then data from each printable field of each source data structure 39 is formatted into a rich text format (as if each of the source data structures 39 were being individually printed) at step 746. The formatted data is inserted into one of the fields of the destination data structure 40 to give the user a "WYSIWYG" version of each source data structure 39. The "textizing" function is described in more detail below with regard to FIG. 10. If the determined transform functions do not include the "textizing" function, step 744 proceeds to step 748.

At step 748, if the determined transform functions include a shortcut function, then a link or path to each of the source data structures 39 is created within one of the fields, preferably the body field, of the destination data structure 40 at step 750. The link preferably a path reference to each of the source data structures 39 and an icon representing each of the source data structures 39. When the user positions the cursor 346 over the icon representing one of the source data structures 39 and clicks the mouse 29, the user is able to view data from the associated source data structure 39 in fields of the appropriate form on the monitor 31. If the determined transform functions do not include the shortcut function, step 748 proceeds to step 752.

At step 752, if the determined transform functions include an attachment function, then a copy of each of the source data structures 39 is attached to the destination data structure 40 at step 754. If the determined transform functions do not include the attachment function, step 752 proceeds to step 756.

Finally, at step 756, the fields of the destination data structure 40 are displayed on the monitor 31 populated with the transformed data from the source data structures 39. In this manner, the user is able to view the results of the transformation or coercion process according to the preferred embodiment of the present invention in each of the fields of the destination data structure 40. The user typically will change or modify the data as desired, and then store the destination data structure 40 in non-volatile memory, such as on the hard disk drive 20.

An important aspect of the present invention involves how the existing data populates the new data structure (the destination data structure 40). Two embodiments that implement this populating task are field mapping and textizing, which are preferably described in more detail below in FIGS. 8–10.

FIG. 8 is a table illustrating the contents of an exemplary lookup table 515, preferably called a Destination Mapping Table, used when mapping the data from fields of a source data structure 39 into particular fields in the destination data structure 40. Referring now to FIGS. 1, 5, and 8, the contents of the exemplary lookup table 515 are represented in a tabular format 800. Essentially, the lookup table 515 is an array or data object containing information on which fields of any type of source data structure 39 correspond or map to fields in a specific type of destination data structure 40.

There are two columns 815–820 in the tabular format 800 illustrating the exemplary lookup table 515. These columns are labeled "Possible Valid Fields" 815 and "Valid Field in the Destination Data Structure" 820. The "Possible Valid Fields" 815 column lists any and all possible fields that are valid in any type of source data structure 39. The "Valid Field in the Destination Data Structure" 820 column lists fields of the specific type of destination data structure 40 in such a way that fields in the "Valid Field in the Destination Data Structure" 820 column correspond to or are adjacent to particular fields in the "Possible Valid Fields" 815 column. In other words, the adjacently listed fields in these columns correspond to each other and provide information on how data in a particular field in the source data structure 39 (listed in the "Possible Valid Fields" 815 column) should be mapped into the destination data structure 40.

When the exemplary lookup table 515 is used by the destination program module 510, the lookup table 515 is essentially "walked" by the destination program module 510 in a predetermined order. The most important of the fields listed at the bottom of the "Possible Valid Fields" 815 column and the least important of the fields is listed at the top. This order becomes important when two different possible valid fields correspond to the same field in the destination data structure. For example, the "Message Follow-up Time" field 830 in the source data structure and the "Task Due Date" field 835 in the source data structure both correspond to the same field in the destination data structure. As described below with regard to FIG. 9, each of the fields in the source data structure (identified by one of the possible valid fields) transfers the existing data over to fields in the destination data structure (adjacent to each of the possible valid fields) according to the listed predetermined order. By listing the "Task Due Date" field 835 after the "Message Follow-up Time" field 830, it is the data within the "Task Due Date" field 835 that ultimately populates the "Start Time" field 840 in the destination data structure.

FIG. 9 is a flow diagram illustrating the preferred steps of a field transform function that uses the lookup table 515 to map fields from the source data structure 39 to corresponding fields in the destination data structure 40. Essentially, the flow diagram in FIG. 9 describes in more detail the field function mentioned in steps 740–742 in FIG. 7C.

Referring now to FIGS. 1, 5, 8, and 9, the preferred steps begin at step 905 where the exemplary lookup table 515, corresponding to a type of destination data structure 40, is read by the destination program module 510. The entry maintains a listing of possible valid fields of any type of source data structure 39 and a corresponding list of fields in the specific type of destination data structure 40 associated with the lookup table 515. The possible valid fields are listed within the lookup table 515 in a predetermined order. This predetermined order lists the most important of the possible valid fields at the bottom of the "Possible Valid Fields" column 815. At the top of the "Possible Valid Fields" column 815 is the least important of the possible valid fields. As shown below, this order becomes important when multiple possible valid fields are mapped into a single field of the destination data structure 40.

At step 910, the first (in the predetermined order) field or topmost field listed in the "Possible Valid Fields" column 815 is identified in the lookup table 515. At step 920, the destination program module 510 determines which field in the destination data structure 40 corresponds to the identified possible valid field by reading the lookup table 515. In other words, the corresponding field is the field listed in the "Valid Field in the Destination Data Structure" column 820 that is directly adjacent to identified possible valid field in FIG. 8. At step 925, any data maintained in the source data structure 39 at the identified possible valid field is loaded into the corresponding field of the destination data structure 40. In other words, the identified possible valid field is used to designate which field of the source data structure 39 contains information that is then loaded into a field of the destination data structure 40. This field in the destination data structure is designated by the field listed in the lookup table 515 adjacent to the identified possible valid field. The destination program module 510 advantageously performs all of this without having to know the type of the source data structure 39.

At step 930, if the identified possible valid field is not the last (bottom listed) field in the predetermined order, then the next field listed in the "Possible Valid Fields" column 815 of the lookup table 515 is identified at step 935 before proceeding back to step 920. Otherwise, the preferred method 900 terminates after step 930. Thus, when the field function is executed, data within each of the listed fields of the source data structure 39 is mapped over so to populate corresponding fields of the destination data structure 40 without having to know the type of the source data structure 39.

The other embodiment of the present invention for populating a new data structure with existing data from an existing data structure is textizing. Essentially, the existing data from the fields of the source data structure 39 is transformed into a much more readable format and inserted within the destination data structure 40.

FIG. 10 is flow diagram illustrating the preferred steps of the text function, also called the "textizing" function, for transforming data maintained within fields of the source data structure 39 into richly formatted data as if the data were to be printed. Essentially, the flow diagram in FIG. 10 describes in more detail the textizing function mentioned in steps 744–746 in FIG. 7C.

Referring now to FIGS. 1, 3E, 7C, and 10, the preferred steps 1000 begin at step 1005 where one of the fields of the source data structure 39 is identified by the destination program module 510. At step 1010, if the destination program module 510 determines that there is no data within the identified field of the source data structure 39, step 1010 proceeds directly to step 1030. Otherwise, step 1010 proceeds to step 1015.

At step 1015, if the identified field of the source data structure 39 cannot be printed, step 1015 proceeds directly to step 1030. In other words, some fields of the source data structure maintain data that is not printed out when the source data structure is printed in the preferred embodiment of the present invention. The destination program module 510 can determine if the identified field can be printed by preferably reading a printable attribute or register maintained for the identified field. However, if the identified field of the source data structure 39 can be printed, then step 1015 proceeds to step 1020.

At step 1020, the data maintained within the identified field of the source data structure 39 is formatted into a predetermined rich text format as if the data were being printed. In this manner, the destination program module 510 creates a "WYSIWYG" version 361 (formatted data) of the data within the source data structure 39 that preferably includes such rich text characteristics as special fonts, bolding, italics, and indenting. However, the present invention should not be limited to the above mentioned rich text format characteristics. An embodiment of the present invention may encompass a rich text format that also changes the size of the text. The key aspect of the predetermined rich text format is that the data within of the source data structure 39 is formatted into a format that captures the data within the source data structure 39 as if the source data structure 39 were being printed.

At step 1025, the destination program module 510 loads the formatted data into one of the fields of the destination data structure 40, preferably a body field 360. At step 1030, if the identified field in the source data structure 39 is the last field in the source data structure 39, then step 1030 proceeds to step 1035 where the next field in the source data structure is identified and step 1035 continues back to step 1010. Otherwise, the preferred method 1000 ends after step 1030.

Summary of the Detailed Description

From the foregoing description, it will be appreciated that the present invention provides a system for creating a new data structure, also referred to as a destination data structure, in memory populated with data from a source data structure. In an embodiment of the present invention, the source data structure 39 maintains the data within its fields. A representation of the source data structure 39 is selected, dragged over, and dropped onto an icon representing a destination program module 510.

The source data structure 39 and the destination program module 510 are each associated with particular types of data structures. If these types of data structures are the same, then a conventional move or copy is performed on the source data structure 39. In other words, no coercion takes place. However, if these types of data structures are different, the destination data structure 40 is coerced from the data in fields of the source data structure 39.

Essentially, the destination data structure 40 is created in memory of the type associated with the destination program module 510. Once the destination data structure 40 is created, the existing data within the source data structure 39 is used or transformed to populate predetermined fields of the destination data structure 40.

One way of populating the destination data structure 40 is by determining which field in the destination data structure 40 corresponds to a given field in the source data structure. Data from the given field of the source data structure 39 is then loaded into the corresponding field of the destination data structure 40. This is performed for each of the fields in the source data structure 39.

Another way of populating the destination data structure 40 is by formatting data from each of the printable fields of the source data structure 39 into a rich text format to yield a formatted version of the source data structure 39 as if it were being printed. The formatted data is then loaded into one of the fields of the destination data structure 40.

In this manner, a user is able to advantageously create the destination data structure 40 in memory already populated with the existing data without having to manually re-enter or perform successive copy and paste operations on the existing data into each field of the destination data structure 40. This optimizes the use of the existing data within the source data structure 39.

The foregoing system may be conveniently implemented in a program module that is based upon the flow charts in FIGS. 6–7 and FIGS. 9–10. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of creating a destination data structure 40 in memory that is populated with existing data from a source data structure 39 when the destination data structure 40 and the source data structure 39 are different types of data structures. However, those skilled in the art will understand that the principles of the present invention apply to any tasks or processes that must efficiently transform structured data from one format into another format.

Although not implemented in the preferred DTIM program module 37*a,* the inventors contemplate applying the principles of the present invention in combination with parsing technology to parse data within any given field of a source data structure into usable fragments in order to populate a specific field of a destination data structure with one of the usable fragments of parsed data. In this manner, a user could "smartly" coerce a name in the source data structure into a first, middle, and last name field of the destination data structure or coerce text from the source data structure into usable numbers, dates, or times in the destination data structure.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented process for populating a destination data structure associated with an application program with data from a source data structure, comprising the steps of;

receiving a user command dragging and dropping a representation of the source data structure onto a representation of the program associated with the destination data structure;

in response to the drag and drop command, displaying a menu of transform functions proximate to the representation of the program module associated with the destination data structure;

receiving user input selecting one of the transform functions;

consulting a field-to-field correspondence table containing an association between fields of the source data structure and fields of the destination data structure to determine the fields of the destination data structure that correspond to the fields of the source data structure; and executing the selected field by field transform function to load data from the fields in the source data structure into the corresponding fields of the destination data structure.

2. The computer-implemented process of claim 1, further comprising the steps of:

displaying the transformed data as it appears in the destination data structure upon completion of the field by field transform function;

opening the destination data structure;

receiving user input editing the transformed data; and saving the destination data structure in a memory.

3. The computer-implemented process of claim 1, wherein the step of executing the field by field transform function comprises the steps of:

altering the format of the data from each of the fields of the source data structure to a predetermined rich text format as if the data were to be printed; and loading the formatted data into the corresponding fields of the destination data structure.

4. The computer-implemented process of claim 1, wherein the step of executing the field by field transform function comprises the step of inserting a link into the corresponding fields of the destination data structure pointing to a copy of the source data structure.

* * * * *